US012192483B2

(12) United States Patent
Jun et al.

(10) Patent No.: US 12,192,483 B2
(45) Date of Patent: *Jan. 7, 2025

(54) IMAGE ENCODING/DECODING METHOD AND APPARATUS WITH SUB-BLOCK INTRA PREDICTION

(71) Applicant: Electronics and Telecommunications Research Institute, Daejeon (KR)

(72) Inventors: Dong San Jun, Daejeon (KR); Jin Ho Lee, Daejeon (KR); Jung Won Kang, Daejeon (KR); Hyun Suk Ko, Daejeon (KR); Sung Chang Lim, Daejeon (KR); Ha Hyun Lee, Seoul (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,848

(22) Filed: Sep. 8, 2023

(65) Prior Publication Data
US 2023/0421778 A1    Dec. 28, 2023

Related U.S. Application Data

(63) Continuation of application No. 17/591,830, filed on Feb. 3, 2022, now Pat. No. 11,800,116, which is a (Continued)

(30) Foreign Application Priority Data

Aug. 1, 2016  (KR) .................. 10-2016-0098095

(51) Int. Cl.
*H04N 19/159*  (2014.01)
*H04N 19/105*  (2014.01)
(Continued)

(52) U.S. Cl.
CPC ......... *H04N 19/159* (2014.11); *H04N 19/105* (2014.11); *H04N 19/126* (2014.11);
(Continued)

(58) Field of Classification Search
None
See application file for complete search history.

(56) References Cited

U.S. PATENT DOCUMENTS

2011/0280304 A1*  11/2011  Jeon .................... H04N 19/176
375/E7.243
2013/0163664 A1    6/2013  Guo et al.
(Continued)

FOREIGN PATENT DOCUMENTS

CN    103081474 A    5/2013
CN    103237216 A    8/2013
(Continued)

OTHER PUBLICATIONS

"Series H: Audiovisual and Multimedia Systems Infrastructure of Audiovisual Services-Coding of Moving Video." Telecommunication Standardization Sector of ITU, Apr. 2013 (317 pages in English).
(Continued)

*Primary Examiner* — Stuart D Bennett
(74) *Attorney, Agent, or Firm* — NSIP Law

(57) ABSTRACT

An image encoding/decoding method and apparatus for performing intra prediction are provided. An image decoding method of the present invention comprises deriving an intra prediction mode for a current block, selecting at least one reconstructed sample line neighboring to the current block, constructing a reference sample using at least one reconstructed sample included in the at least one recon-
(Continued)

structed sample line, and performing intra prediction for the current block based on the intra prediction mode and the reference sample.

7 Claims, 19 Drawing Sheets

Related U.S. Application Data continuation of application No. 16/321,145, filed as application No. PCT/KR2017/008286 on Aug. 1, 2017, now Pat. No. 11,405,620.

(51) Int. Cl.
*H04N 19/126* (2014.01)
*H04N 19/13* (2014.01)
*H04N 19/176* (2014.01)
*H04N 19/50* (2014.01)
*H04N 19/593* (2014.01)

(52) U.S. Cl.
CPC ........... *H04N 19/13* (2014.11); *H04N 19/176* (2014.11); *H04N 19/50* (2014.11); *H04N 19/593* (2014.11)

(56) References Cited

U.S. PATENT DOCUMENTS

| | | |
|---|---|---|
| 2013/0170546 A1 | 7/2013 | Kim et al. |
| 2013/0251036 A1 | 9/2013 | Lee et al. |
| 2013/0266063 A1 | 10/2013 | Jun et al. |
| 2014/0133559 A1 | 5/2014 | Kim et al. |
| 2014/0314142 A1 | 10/2014 | Oh et al. |
| 2015/0264348 A1 | 9/2015 | Zou et al. |
| 2016/0112719 A1 | 4/2016 | Kwon et al. |
| 2017/0094274 A1 | 3/2017 | Chien et al. |
| 2017/0359595 A1 | 12/2017 | Zhang et al. |
| 2018/0343469 A1* | 11/2018 | Jin ................... H04N 19/59 |
| 2019/0238835 A1 | 8/2019 | Lee |

FOREIGN PATENT DOCUMENTS

| | | |
|---|---|---|
| JP | 2013-141187 A | 7/2013 |
| KR | 10-2008-0067363 A | 7/2008 |
| KR | 10-2010-0081974 A | 7/2010 |
| KR | 10-2011-0067539 A | 6/2011 |
| KR | 10-2012-0103517 A | 9/2012 |
| KR | 10-2013-0005233 A | 1/2013 |
| KR | 10-2013-0020562 A | 2/2013 |
| KR | 10-1292091 B1 | 8/2013 |
| KR | 10-2015-0043278 A | 4/2015 |
| KR | 10-2015-0059145 A | 5/2015 |
| KR | 10-2403152 B1 | 5/2022 |
| KR | 10-2555345 B1 | 7/2023 |
| WO | WO 2013/111977 A1 | 8/2013 |

OTHER PUBLICATIONS

Li et al. "Multiple line-based intra prediction" Joint Video Exploration Team (JVET) of ITU-T SG 16 WP 3 and ISO/IEC UTC 1/SC 29/WG 11, 3rd Meeting: Geneva, CH, May 26-Jun. 1, 2016, JVET-C0071-v2, 6 pp (year:2016).

Chang, Yao-Jen et al. Arbitrary reference tier for intra directional modes "Joint Video Exploration Team (JVET) of ITU-T SG 16 WP 3 and ISO/IEC JTC 1/SC 29/WG 11", , 3rd Meeting: Geneva, CH May 26-Jun. 1, 2016 (5 pages in English).

Vadim, Serein, et al. Neighbor based intra most probable modes list derivation"Joint Video Exploration Team (JVET) of ITU-T SG 16 WP 3 and ISO/IEC JTC 1/SC 29/WG 11", , 3rd Meeting: Geneva, CH May 26-Jun. 1, 2016 (4 pages in English).

Li, Jiahao, et al. Multiple line-based intra prediction "Joint Video Exploration Team (JVET) of ITU-T SG 16 WP 3 and ISO/IEC JTC 1/SC 29/WG 11", 3rd Meeting: Geneva, CH May 26-Jun. 1, 2016 (6 pages in English).

Chen, Jianle, et al. Algorithm Description of Joint Exploration Test Model 3 "Joint Video Exploration Team (JVET) of ITU-T SG 16 WP 3 and ISO/IEC JTC 1/SC 29/WG 11", 3rd Meeting: Geneva, CH May 26-Jun. 1, 2016 (37 pages in English).

International Search Report issued on Nov. 17, 2017, in corresponding International Application PCT/KR2017/008286 (4 pages in English, 4 pages in Korean).

Li, et al., "Multiple line-based intra prediction" JVET-C0071, Joint Video Exploration Team (JVET) of ITU-T SG 16 WP 3 and ISO/IEC JTC 1/SC 29/WG 11, 3rd Meeting: Geneva, CH, May 26-Jun. 1, 2016, (6 pages).

* cited by examiner (a)

(b)

(a)

(b)

(a)

pF[-1][-1]=(p[-1][0]+2*p[-1][-1]+p[0][-1]+2)>>2
pF[-1][y]=(p[-1][y+1]+2*p[-1][y]+p[-1][y-1]+2)>> 2 for y=0..nTbS-1
pF[-1][nTbS*2-1]=p[-1][nTbS*2-1]
pF[x][-1]=(p[x-1][-1]+2*p[x][-1]+p[x+1][-1]+2)>> 2 for x=0..nTbS-1
pF[nTbS*2-1][-1]=p[nTbS*2-1][-1]

(b)

IMAGE ENCODING/DECODING METHOD AND APPARATUS WITH SUB-BLOCK INTRA PREDICTION

CROSS REFERENCE TO RELATED APPLICATION(S)

This application is a Continuation Application of U.S. patent application Ser. No. 17/591,830, filed on Feb. 3, 2022, which is a Continuation Application of U.S. patent application Ser. No. 16/321,145, filed on Jan. 28, 2019, now U.S. Pat. No. 11,405,620, issues on Aug. 2, 2022, which is a U.S. National Stage Application of International Application No. PCT/KR2017/008286, filed on Aug. 1, 2017, which claims the benefit under USC 119(a) and 365(b) of Korean Patent Application No. 10-2016-0098095, filed on Aug. 1, 2016, in the Korean Intellectual Property Office, the entire disclosures of which are incorporated herein by reference for all purposes.

TECHNICAL FIELD

The present invention relates to a method and apparatus for encoding/decoding an image. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency.

Another object of the present invention is to provide a method and apparatus for encoding and decoding an image using intra prediction to enhance compression efficiency.

Another object of the present invention is to provide a recording medium storing a bitstream generated by an image encoding method/apparatus of the present invention.

Technical Solution

An image decoding method according to the present invention may comprise deriving an intra prediction mode for a current block, selecting at least one reconstructed sample line neighboring to the current block, constructing a reference sample using at least one reconstructed sample included in the at least one reconstructed sample line, and performing intra prediction for the current block based on the intra prediction mode and the reference sample.

In the image decoding method of the present invention, the at least one reconstructed sample line may include at least one of neighbor reconstructed sample lines adjacent to an upper side and a left side of the current block.

In the image decoding method of the present invention, the number of the neighbor reconstructed sample lines adjacent to the upper side and the left side may be determined based on at least one of a size, a shape, and an intra prediction mode of the current block.

In the image decoding method of the present invention, the reference sample may be derived using a weighted sum of the at least one reconstructed sample.

In the image decoding method of the present invention, the weighted sum may be performed based on at least one of the intra prediction mode and a distance between the current block and the reconstructed sample line.

In the image decoding method of the present invention, the construction of a reference sample may further comprise searching a reconstructed sample similar to the current block from among reconstructed samples included in at least one of a top row and a left column neighboring to the current block, and replacing at least one reconstructed sample included in the reconstructed sample line with the searched reconstructed sample.

The image decoding method of the present invention may further comprise dividing the current block into a plurality of sub-blocks, and intra prediction may be performed for each of the plurality of sub-blocks based on a reference sample constructed on the basis of the current block.

In the image decoding method of the present invention, when intra prediction is performed for one of the plurality of sub-blocks using the reference sample constructed on the basis of the current block, the intra prediction may be performed after compensating a reference sample which is not neighboring to the one sub-block.

In the image decoding method of the present invention, the performing of intra prediction may comprise predicting at least one sample among samples included in a right column, samples included in a bottom row, and a bottom right sample within the current block, using the at least one reconstructed sample, and predicting remaining samples within the current block, using the at least one predicted sample.

An image decoding apparatus according to the present invention may comprise an intra predictor which is configured to derive an intra prediction mode for a current block, to select at least one reconstructed sample line neighboring to the current block, to construct a reference sample using at least one reconstructed sample included in the at least one reconstructed sample line, and to perform intra prediction for the current block based on the intra prediction mode and the reference sample.

An image encoding apparatus according to the present invention may comprise determining an intra prediction mode for a current block, selecting at least one reconstructed sample line neighboring to the current block, constructing a reference sample using at least one reconstructed sample included in the at least one reconstructed sample line, and performing intra prediction for the current block based on the intra prediction mode and the reference sample.

In the image encoding method of the present invention, the at least one reconstructed sample line may include at least one among reconstructed sample lines adjacent to an upper side and a left side of the current block.

In the image encoding method of the present invention, the number of the neighbor reconstructed sample lines adjacent to the upper side and the left side may be determined based on at least one of a size, a shape, and an intra prediction mode of the current block.

In the image encoding method of the present invention, the reference sample may be derived using a weighted sum of the at least one reconstructed sample.

In the image encoding method of the present invention, the weighted sum may be performed based on at least one of the intra prediction mode and a distance between the current block and the reconstructed sample line.

In the image encoding method of the present invention, the construction of a reference sample may comprise searching a reconstructed sample similar to the current block from among reconstructed samples included in at least one of an upper row and a left column neighboring to the current block, and replacing at least one reconstructed sample included in the reconstructed sample line with the searched reconstructed sample.

The image encoding method of the present invention may further comprise dividing the current block into a plurality of sub-blocks, and intra prediction may be performed for each of the plurality of sub-blocks based on a reference sample constructed on the basis of the current block.

In the image encoding method of the present invention, when intra prediction is performed for one of the plurality of sub-blocks using the reference sample constructed on the basis of the current block, the intra prediction may be performed after compensating a reference sample which is not neighboring to the one sub-block.

An image encoding apparatus according to the present invention may comprises an intra predictor which is configured to determine an intra prediction mode for a current block, to select at least one reconstructed sample line neighboring to the current block, to construct a reference sample using at least one reconstructed sample included in the at least one reconstructed sample line, and to perform intra prediction for the current block based on the intra prediction mode and the reference sample.

A recording medium according to the present invention may store a bitstream generated by an image encoding method, and the method may comprise determining an intra prediction mode for a current block, selecting at least one reconstructed sample line neighboring to the current block, constructing a reference sample using at least one reconstructed sample included in the at least one reconstructed sample line, and performing intra prediction for the current block based on the intra prediction mode and the reference sample.

Advantageous Effects

According to the present invention, a method and apparatus for encoding and decoding an image to enhance compression efficiency may be provided.

According to the present invention, a method and apparatus for encoding and decoding an image using intra prediction to enhance compression efficiency may be provided.

According to the present invention, a recording medium storing a bitstream generated by an image encoding method/apparatus of the present invention may be provided.

MODE FOR CARRYING OUT THE INVENTION

Figure 1:
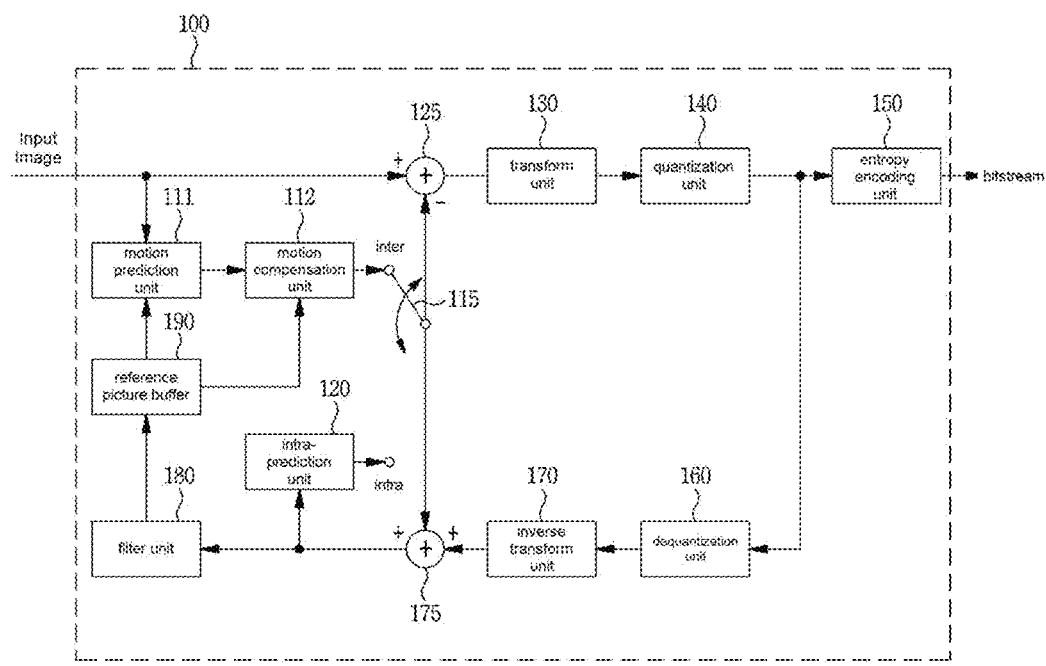
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an M×N matrix. Here, M and N are positive integers, and the block may mean a sample matrix in a two-dimensional form.

Sample: is a basic unit of a block, and may indicate a value ranging 0 to $2^{Bd}-1$ depending on the bit depth (Bd). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
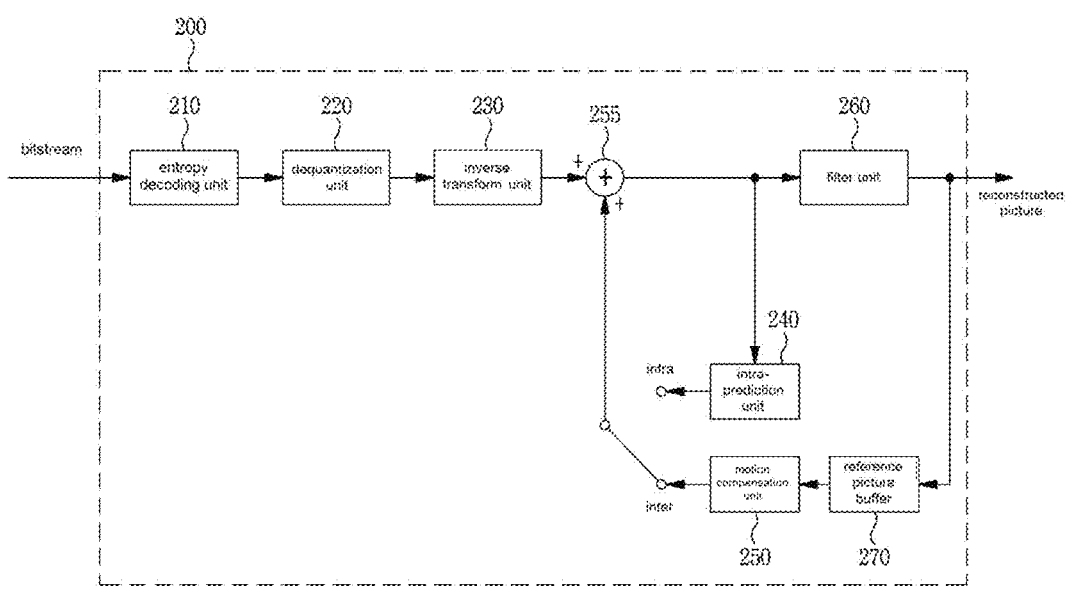
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning. According to the size of the transform unit and the intra-prediction mode, instead of up-right scanning, it is possible to use vertical direction scanning and horizontal direction scanning. That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
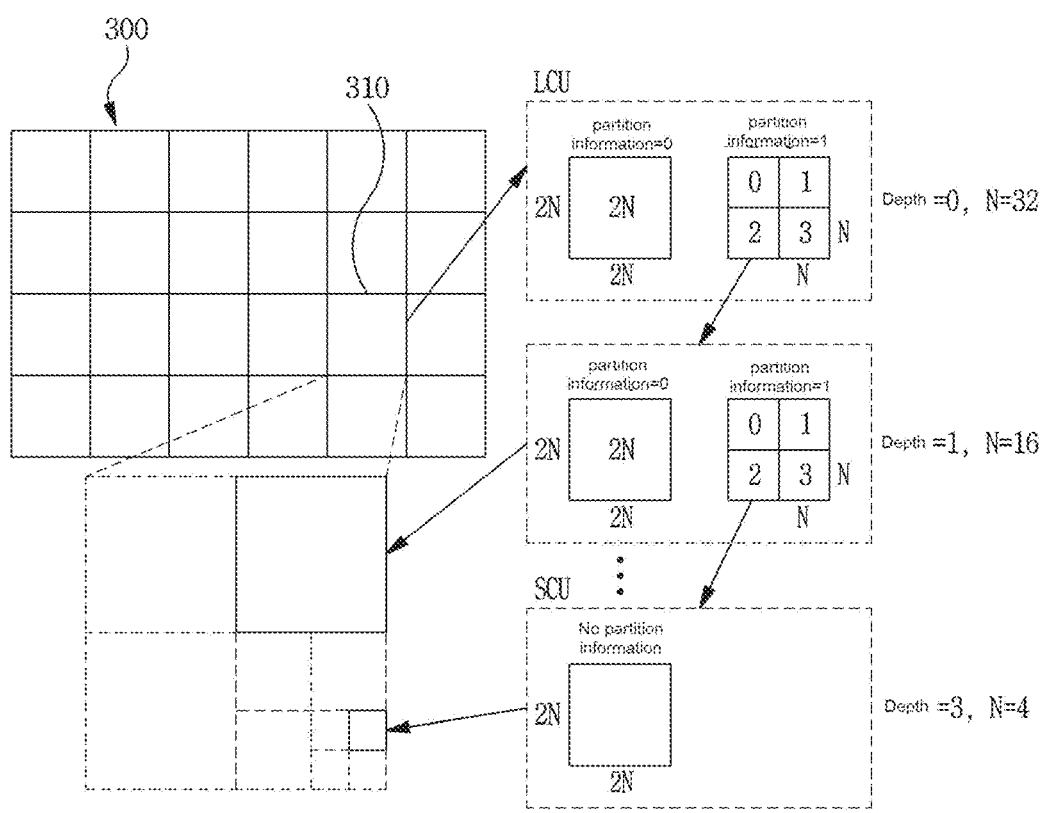
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
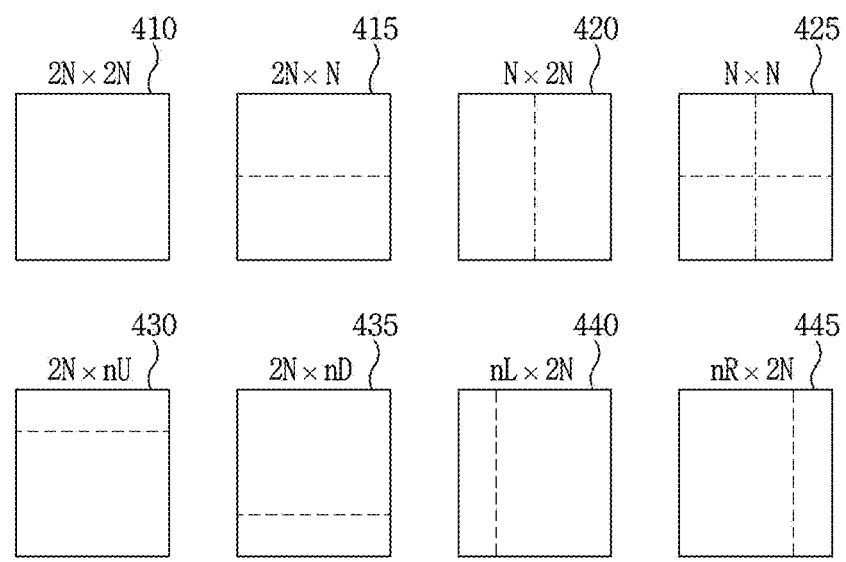
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
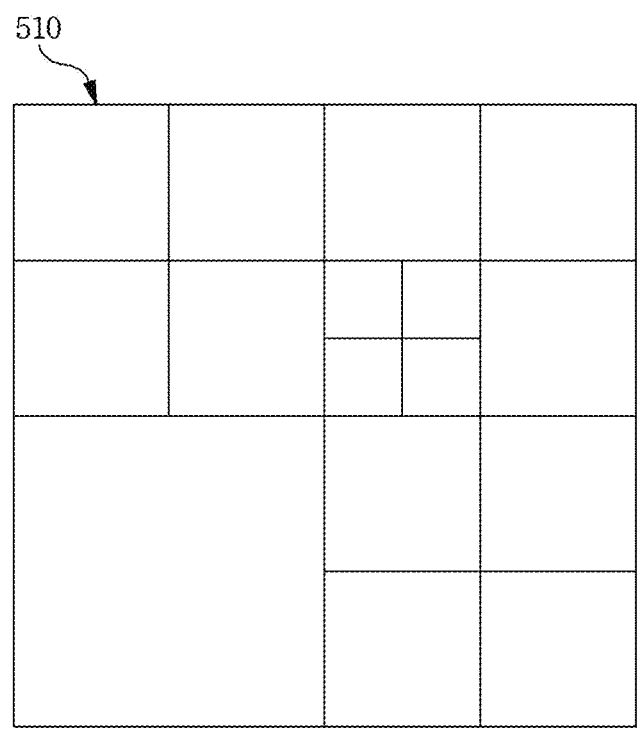
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
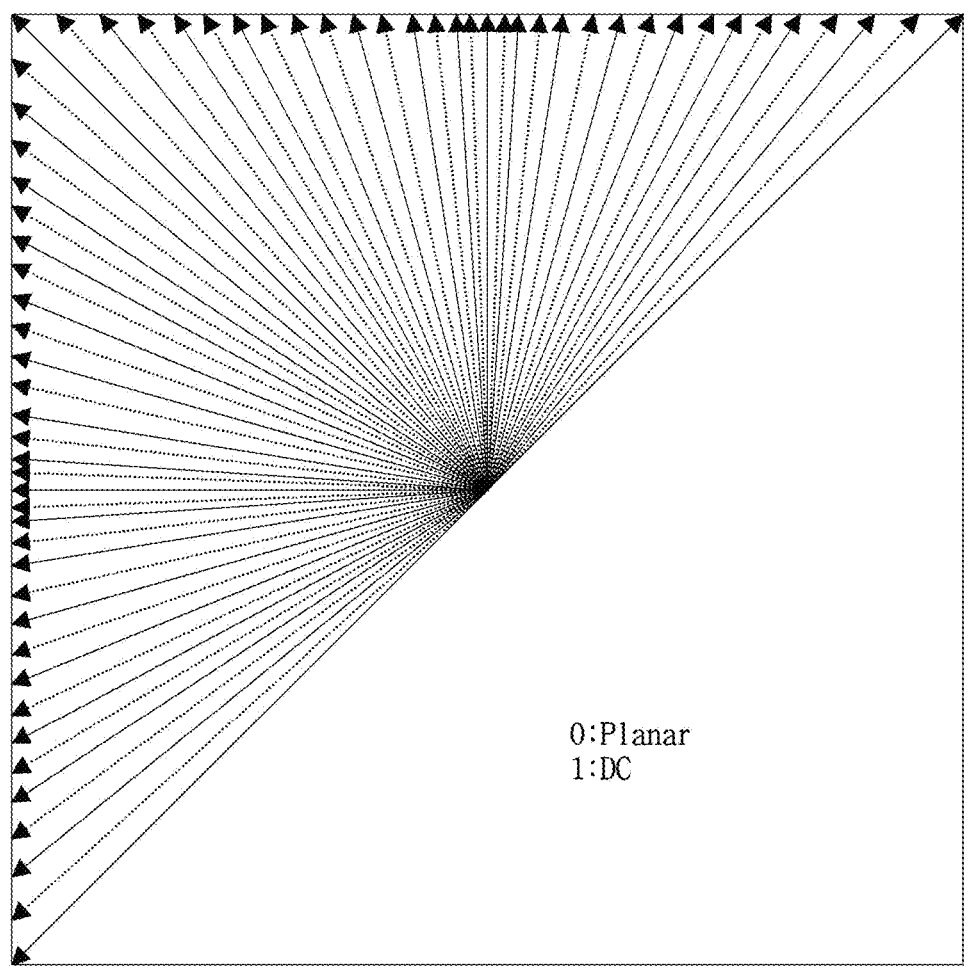
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

Figure 7:
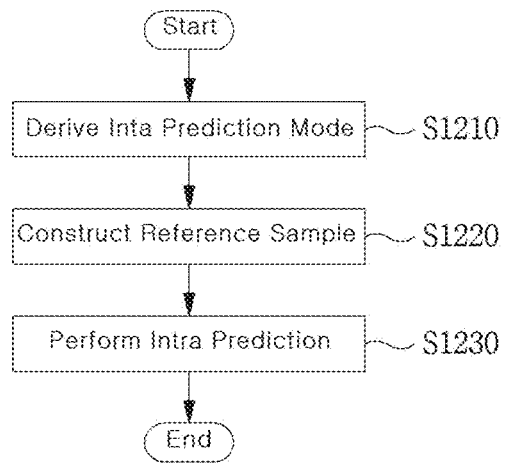
FIG. 7 is a view depicting a method for performing intra prediction on a current block according to an embodiment of the present invention.

FIG. 7 is a view depicting a method for performing intra prediction on a current block according to an embodiment of the present invention.

As illustrated in FIG. 7, intra prediction may include deriving an intra prediction mode (S1210), constructing a reference sample (S1220), and/or performing intra prediction (S1230).

In the step of deriving an intra prediction mode (S1210), an intra prediction mode of a neighbor block may be used, an intra prediction mode of a current block may be decoded (e.g., entropy-decoded) from a bitstream, and/or the intra prediction mode of the current block may be derived using a coding parameter of a neighbor block. Or, in the step of deriving an intra prediction mode (S1210), the intra prediction mode of the current block may be derived, using an intra prediction mode of a neighbor block, a combination of one or more intra prediction modes of neighbor blocks, and/or an intra prediction mode derived by MPM.

In the step of constructing a reference sample (S1220), a reference sample may be constructed by performing reference sample selection and/or reference sample filtering.

In the step of performing intra prediction (S1230), intra prediction may be performed for the current block, using non-directional prediction, directional prediction, location information-based prediction, and/or luma/chroma signal-based prediction. In the step of performing intra prediction (S1230), filtering may be additionally performed on a prediction sample. If directional prediction is performed, different directional predictions may be performed according to one or more sample units. For example, the one or more sample units may be a single sample, a sample group, a line, and/or a sub-block.

Hereinbelow, the step of deriving an intra prediction mode (S1210) will be described in greater detail.

As described before, to derive the intra prediction mode of the current block, at least one of a method for using intra prediction modes of one or more neighbor blocks, a method for decoding an intra prediction mode of a current block from a bitstream, and a method for using a coding parameter of a neighbor block may be used. A neighbor block(s) may be one or more blocks reconstructed before encoding/decoding of the current block.

If the neighbor block is located outside the boundary of at least one predetermined unit such as a picture, a slice, a tile, and a Coding Tree Unit (CTU), or a PCM mode or inter prediction has been applied to the neighbor block, it may be determined that the neighbor block is unavailable. An intra prediction mode corresponding to the unavailable neighbor block may be replaced with a DC mode, a Planar mode, or a predetermined intra prediction mode.

The current block may be of size W×H where W and H are positive integers and may be equal or different. W and/or H may be at least one of, for example, 2, 4, 8, 16, 32, 64, 128, 256, and 512.

Figure 8:
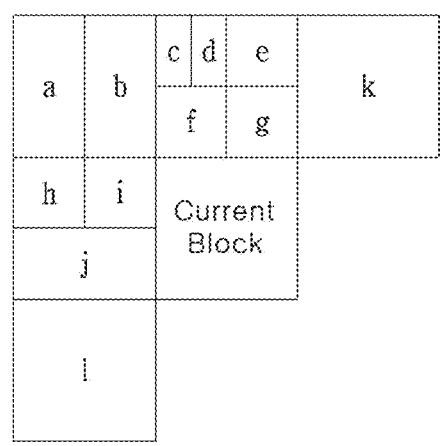
FIG. 8 is a view depicting a method for deriving an intra prediction mode of a current block from a neighbor block.

FIG. 8 is a view depicting a method for deriving an intra prediction mode of a current block from a neighbor block.

In FIG. 8, a to k marked on neighbor blocks may denote intra prediction modes of the neighbor blocks or the numbers of the intra prediction modes. The position of a neighbor block used to derive the intra prediction mode of the current block may be a predefined fixed position. Or information about the position of the neighbor block may be derived by encoding/decoding. In the present disclosure, encoding/decoding may be used to include entropy encoding and decoding.

In the case where an intra prediction mode of a neighbor block is used, a specific mode of a neighbor block may be derived as the intra prediction mode of the current block. For example, intra prediction mode i, f, b, g, h, j, l or e of a neighbor block adjacent to a predetermined position of the current block may be derived as the intra prediction mode of the current block. The predetermined position may be encoded/decoded from a bitstream or may be derived based on a coding parameter.

Or one or more of the neighbor blocks of the current block may be selected. The selection may be made based on information explicitly signaled by a bitstream. Or the selection may be made according to a criterion preset between an encoder and a decoder. The intra prediction mode of the current block may be derived from the intra prediction modes of the selected one or more neighbor blocks. For example, the intra prediction mode of the current block may be derived using a statistic value of the intra prediction modes of the selected neighbor blocks. For example, the statistic value may include a minimum value, a maximum value, a mean value, a weighted mean, a most frequent value, and/or a median value.

For example, a statistic value of a part or all of intra prediction modes b, f, g, i and j of neighboring blocks may be derived as the intra prediction mode of the current block.

Or, the intra prediction mode of the current block may be derived by combining the intra prediction modes of one or more neighbor blocks. An intra prediction mode may be represented as at least one of a mode number, a mode value, and a mode angle. For example, the mean of one or more intra prediction modes of neighbor blocks may be derived as the intra prediction mode of the current block. The mean of two intra prediction modes may refer to at least one of a median number between two mode numbers, the median value of two mode values, and the median angle between two mode angles.

For example, a mode corresponding to the mean of the mode values of intra prediction modes i and f of the neighbor blocks to which the left and upper samples adjacent to the sample (0, 0) of the current block belong may be derived as the intra prediction of the current block. For example, the intra prediction mode of the current block, Pred_mode may be derived by at least one of methods (1), (2), and (3) described in [Equation 1].

[Equation 1]

$$\text{Pred\_mode}=(i+f)>>1 \quad (1)$$

$$\text{Pred\_mode}=(i+f+1)>>1 \quad (2)$$

$$\text{Pred\_mode}=(i+f)/2 \quad (3)$$

Or if intra prediction mode i of the neighbor block is a non-directional mode, the intra prediction mode of the current block may be derived as intra prediction mode i. Or, if intra prediction mode f of the neighbor block is a directional mode, the intra prediction mode of the current block may be derived as intra prediction mode f.

Or, the intra prediction mode of the current block may be derived as a mode corresponding to the mean of at least one of the mode values of intra prediction modes b, f, g, i, and j of the neighbor blocks. For example, the intra prediction mode of the current block, Pred_mode may be derived by at least one of methods (1), (2), (3), and (4) described in [Equation 2].

[Equation 2]

$$\text{Pred\_mode}=(f+g+i+j+2)>>2 \quad (1)$$

$$\text{Pred\_mode}=(b+f+g+i+j)/5 \quad (2)$$

$$\text{Pred\_mode}=(i+f+k+l+2)>>2 \quad (3)$$

$$\text{Pred\_mode}=(b+f+k+i+l)/5 \quad (4)$$

Or, a mode corresponding to the mean of available intra prediction modes of adjacent neighbor blocks may be derived as the intra prediction mode of the current block. For example, if a left neighbor block of the current block is located outside of the boundary of a picture a tile, a slice, and/or a CTU, or corresponds to at least one of a PCM mode or an inter prediction mode and thus is not available, a mode corresponding to a statistic value of the intra prediction modes (e.g., f and g) of upper neighbor blocks may be derived as the intra prediction mode of the current block.

For example, a weighted mean or weighted sum may be used as the statist value of the intra prediction modes of the neighbor blocks. Herein, weights may be assigned based on the directionalities of the intra prediction modes of the neighbor blocks. For example, modes to which relatively large weights are assigned may be predefined or signaled. For example, the modes to which relatively large weights are assigned may be at least one of a vertical directional mode, a horizontal directional mode, and a non-directional mode. The same weight or different weights may be assigned to these modes. For example, the weighted sum of intra prediction modes i and f may be derived as the intra prediction mode of the current block, Pred_mode by [Equation 3] below. In [Equation 3] below, mode f may be a mode to which a relatively large weight is assigned (e.g., a vertical directional mode).

$$\text{Pred\_mode}=(i+3*f+2)>>2 \quad \text{[Equation 3]}$$

Or, the weights to be used for the weighted sum may be determined based on the sizes of the neighbor blocks. For example, if the size of an upper block adjacent to the current block is larger than that of a left block adjacent to the current block, a larger weight may be assigned to the intra prediction mode of the upper adjacent block. Or, a larger weight may be assigned to the intra prediction mode of the smaller neighbor block.

Or, if one or more intra prediction modes of neighbor blocks are a non-directional mode, the non-directional mode may be derived as the intra prediction mode of the current block. Or, the intra prediction mode of the current block may be derived using the intra prediction modes of neighbor blocks except for the non-directional mode. If all of the intra prediction modes of the neighbor blocks are a non-directional mode, the intra prediction mode of the current block may be derived as at least one of the DC mode or the Planar mode.

Or, the intra prediction mode of the current block may be derived using Most Probable Mode (MPM) based on the intra prediction mode of a neighbor block. If MPM is used, one or more pieces of information about the intra prediction mode of the current block may be encoded/decoded.

If MPM is used, an MPM list may be configured. The MPM list may include an intra prediction mode derived based on the intra prediction mode of a neighbor block. The MPM list may include N candidate modes. N is a positive integer and may vary depending on the size and/or shape of the current block. Or, information about N may be signaled by a bitstream.

For example, the intra prediction mode of the current block derived using the one or more intra prediction modes of the neighbor blocks may be a candidate mode included in the MPM list.

In the example illustrated in FIG. 8, the intra prediction modes of the neighbor blocks at the same positions of (−1, H−1), (W−1, −1), (W, −1), (−1, H), and (−1, −1) adjacent to the current block may be used, for example, the MPM list may be made in the order of j, g, Planar, DC, l, k, and b. Or, the MPM list may be made in the order of i, f, Planar, DC, l, k, and b. A repeated mode may be included once in the MPM list. If the MPM list is not filled up due to the presence of repeated modes, an additional candidate mode may be included in the list based on the modes included in the list. For example, a mode corresponding to +N or —N (N is a positive integer, for example, 1) of a mode included in the list may be added to the list. Or, at least one of modes that are not included in the list, among a horizontal mode, a vertical mode, a 45-degree mode, a 135-degree mode, and a 225-degree mode, may be added to the list.

An indicator (e.g., prev_intra_luma_pred_flag) indicating whether the same mode as the intra prediction mode of the current block is present in the derived MPM list may be encoded in a bitstream or may be decoded from a bitstream.

If the indicator indicates the presence of the same mode as the intra prediction mode of the current block in the MPM list, index information (e.g., mpm_idx) indicating which mode it is among the modes included in the MPM list may be encoded in a bitstream or decoded from a bitstream. The intra prediction mode of the current block may be derived based on the decoded index information.

If the indicator indicates the absence of the same mode as the intra prediction mode of the current block in the MPM list, information about the intra prediction mode of the current block may be encoded in a bitstream or decoded from the bitstream. The intra prediction mode of the current block may be derived based on the decoded information about the intra prediction mode of the current block. Herein, intra prediction modes that are not included in the MPM list may be arranged in at least one of an ascending order or a descending order. Or one or more of the intra prediction modes that are not included in the MPM list may be grouped into one or more groups. For example, modes corresponding to +N or −N (N is a positive integer, for example, 1, 2 or 3) of the intra prediction modes included in the MPM list may be grouped into one group. Herein, the group may include a predetermined number of (e.g., 8 or 16) intra prediction modes, and the modes included in the group may not be included in the MPM list.

Or a predetermined candidate in the derived MPM list may be derived as the intra prediction mode of the current block. For example, a mode corresponding to list 0 which is the first mode in the MPM list may be derived as the intra prediction mode of the current block. Or, an index corresponding to a predetermined mode in the list may be encoded/decoded, and the corresponding mode may be derived as the intra prediction mode of the current block.

Regarding configuration of the MPM list, one MPM list may be made for a block of a predetermined size. If the block of the predetermined size is divided into a plurality of sub-blocks, each of the plurality of sub-blocks may use the MPM list.

For example, if the current block corresponds to a block of the predetermined size, an MPM list may be made for the current block. If the current block is divided into one or more sub-blocks, an intra prediction mode may be derived for each of the sub-blocks, using the constructed MPM list.

Regarding configuration of an MPM list, an MPM list may be made for each of sub-blocks into which a block of a predetermined size is divided.

For example, if the current block corresponds to a block of the predetermined size, an MPM list may be made for each sub-block of the current block, using the intra prediction modes of a neighbor block of the current block.

Or the intra prediction mode of the current block may be derived, using at least one of an intra prediction mode of the current block derived by MPM and the intra prediction modes of a neighbor block.

For example, if the intra prediction mode of the current block derived by MPM is Pred_mpm, the intra prediction mode of the current block may be derived by changing Pred_mpm to a specific mode, using one or more intra prediction modes of neighbor blocks.

For example, Pred_mpm may be incremented or decremented by N by comparing Pred_mpm with the intra prediction mode of a neighbor block in size. Herein, N may be a predetermined integer such as +1, +2, +3, 0, −1, −2, or −3. For example, if Pred_mpm is less than the intra prediction mode of a neighbor block and/or a statistic value of the intra prediction modes of one or more neighbor blocks, Pred_mpm may be incremented. Or, if Pred_mpm is greater than the intra prediction mode of the neighbor block, Pred_mpm may be decremented. Or, the intra prediction mode of the current block may be derived based on Pred_mpm and/or a value compared with Pred_mpm.

In the example illustrated in FIG. 8, for example, if Pred_mpm is less than the mode value of f, Pred_mpm+1 may be derived as the intra prediction mode of the current block. Or, if Pred_mpm is less than the average value of the mode values of f and i, Pred_mpm+1 may be derived as the intra prediction mode of the current block. Or, if Pred_mpm is less than the average value of the mode values of f and i, an increase of ½ of the difference between Pred_mpm and the average value may be made. For example, Pred_mpm+ {((f+i+1)>>1−Pred_mpm+1)>>1} may be derived as the intra prediction mode of the current block.

Or, if one of Pred_mpm and the mode of a neighbor block is a non-directional mode and the other is a directional mode, the non-directional mode may be derived as the intra prediction mode of the current block, or the directional mode may be derived as the intra prediction mode of the current block.

As described before, the intra prediction mode of the current block may be derived by encoding/decoding. Herein, the intra prediction mode of a neighbor block may not be used. For example, the intra prediction mode of the current block may be derived by entropy-encoding/decoding a bitstream.

For example, if the current block is divided into lower blocks or sub-blocks, the intra prediction mode of each of the sub-blocks may be derived, using at least one of the afore-described methods for deriving an intra prediction mode of a current block.

The size of the current block and the size of a sub-block may be M×N. M and N may be the same or different positive integers. For example, the current block or the sub-block may be at least one of a CTU, CU, SU (signalling unit), QTMax, QTMin, BTMax, BTMin, 4×4, 8×8, 16×16, 32×32, 64×64, 128×128, 256×256, 4×8, 8×16, 16×8, 32×64, 32×8, and 4×32 in size. Herein, QTMax and QTMin may represent maximum and minimum sizes which allow division into a quadtree, respectively, and BTMax and BTMin may represent maximum and minimum sizes which allow division into a binary tree, respectively. Hereinbelow, the size of a sub-block may mean a division structure of a sub-block.

The sub-block size may vary depending on the size of the current block. For example, 1/N of the horizontal and vertical sizes of the current block may be the sub-block size. N may be a positive integer, and may be at least one of 2, 4, 8, 16, 32, and 64. For example, if the current block is of size 32×32 and N for 1/N of the horizontal and vertical sizes of the current block is 4, the sub-block size may be 8×8.

Or, the sub-block size may be a predetermined fixed size irrespective of the size of the current block. For example, the sub-block size may be a minimum size irrespective of the size of the current block, and may be, for example, 4×4.

Or, the sub-block size may be determined based on the division structure of a neighbor block of the current block. For example, if an adjacent neighbor block is divided, the sub-block size may be determined by dividing the current block.

The sub-block size may be determined based on the intra prediction mode of a neighbor block of the current block. For example, the sub-block size may be determined by block division into sub-blocks on the basis of a boundary by which intra prediction modes of neighbor blocks become different.

The sub-block size may be determined based on a coding parameter of a neighbor block. For example, the sub-block size may be determined by block division into sub-blocks based on whether a neighbor block is an intra coding block or an inter coding block.

At least one of the current block size, the sub-block size, and N by which a current block is divided may be fixed to a predetermined value.

For example, in the case where a predetermined fixed size for a current block is 16×16, if the current block is of size 16×16, the current block may be divided into sub-blocks and an intra prediction mode for each sub-block may be derived.

For example, in the case where a predetermined fixed size for a current block is a CTU and N is 4, if the size of the current block is a CTU, an intra prediction mode may be derived on a sub-block basis, each sub-block resulting from dividing the latitude and longitude of the CTU by 4.

The one or more sub-blocks may further be divided into smaller blocks. For example, if the size of the current block is 32×32 and the sub-block size is 16×16, each of one or more sub-blocks may be divided into smaller blocks each of size 8×8, 4×4, 16×8, 4×16, or the like.

At least one of the current block size, the sub-block size, and N by which the current block is divided may be encoded/decoded.

The division structure of a sub-block for the current block may be encoded/decoded. The sub-blocks into which the current block is divided may vary in size and/or shape. Further, an intra prediction mode may be derived for each sub-block.

An indicator (e.g., a flag) indicating that the intra prediction mode of the current block is derived using the intra prediction mode of a neighbor block may be encoded/decoded. For example, the indicator may be NDIP_flag (Neighbouring mode Dependent Intra Prediction). The indicator may be encoded/decoded for at least one of the current block or each sub-block. The indicator may be encoded/decoded, only when the current block size or the sub-block size corresponds to a predetermined size or a predetermined size range. The predetermined size may be, for example, 64×64 or BTMax. As described before, the current block may be divided into a plurality of sub-blocks. The division structure of a sub-block may be predefined or encoded/decoded.

If NDIP_flag is 1 for the current block, the intra prediction mode of the current block or the intra prediction mode of each sub-block of the current block may be derived using the intra prediction mode of a neighbor block. In this case, at least one of prev_intra_luma_pred_flag, mpm_idx, rem_intra_luma_pred_mode, intra_chroma_pred_mode, split_flag, QB_flag, quadtree_flag, binarytree_flag, and Btype_flag for the current block and/or a sub-block may not be encoded/decoded.

For example, if NDIP_flag is 1 for the current block, the intra prediction mode of the current block may be decoded, and then the intra prediction mode of each sub-block may be derived using the decoded intra prediction mode and the intra prediction mode of a neighbor block. Herein, at least one of prev_infra_luma_pred_flag, mpm_idx, rem_intra_luma_pred_mode, intra_chroma_pred_mode, split_flag, QB_flag, quadtree_flag, binarytree_flag, and Btype_flag for the sub-block may not be encoded/decoded.

If NDIP_flag is 0 for the current block, information related to at least one of the intra prediction mode of the current block or the sub-block and division information of a sub-block may be encoded/decoded.

Among the sub-blocks of the current block, the intra prediction mode of a first sub-block may be derived in a different manner from the other sub-blocks. The first sub-block may be one of a plurality of sub-blocks in the current block. For example, the first sub-block may be a first sub-block in a Z scan order.

The intra prediction mode of the first sub-block may refer to an initial mode. For example, if the intra prediction mode of each sub-block is derived as the mean of the intra prediction modes of blocks to the left of and above the sub-block, the initial mode may be derived in a different method. The different method for deriving the initial mode may be at least one of the methods for deriving an intra prediction mode according to the present invention.

For example, an $N^{th}$ (e.g., first) mode listed in an MPM list may be derived as the initial mode. Or, the most frequent one of the intra prediction modes of one or more neighbor blocks of the current block may be derived as the initial mode. Or, an intra prediction mode encoded/decoded for the current block may be derived as the initial mode. Or, an intra prediction mode encoded/decoded for the first sub-block may be derived as the initial mode.

Regarding derivation of an intra prediction mode for a sub-block in the current block, the intra prediction modes of one or more sub-blocks may be derived in an arbitrary order. The arbitrary order may be a scanning order, and scanning may correspond to at least one of raster scanning, upright scanning, vertical scanning, horizontal scanning, diagonal scanning, and zigzag scanning. The number of sub-blocks for which intra prediction modes are derived in the scanning order may be 1 or larger. The arbitrary order may be determined adaptively according to the intra prediction mode of a neighbor block.

Now, a detailed description will be given of the reference sample construction step S1220.

In intra prediction of the current block or a sub-block having a smaller size and/or shape than the current block, a reference sample may be constructed for the prediction. The following description is given in the context of the current block, and the current block may mean a sub-block. The reference sample may be constructed, using one or more reconstructed samples or sample combinations neighboring to the current block. Additionally, filtering may be applied in constructing the reference sample. Herein, the reference sample may be constructed using each reconstructed sample on a plurality of reconstructed sample lines, as it is. Or, the reference sample may be constructed after filtering between samples on the same reconstructed sample line. Or, the reference sample may be constructed after filtering between samples on different reconstructed sample lines. The constructed reference sample may be denoted by ref[m, n], and a reconstructed neighbor sample or a sample obtained by filtering the reconstructed neighbor sample may be denoted by rec[m, n]. Herein, m or n may be a predetermined integer value.

Figure 9:
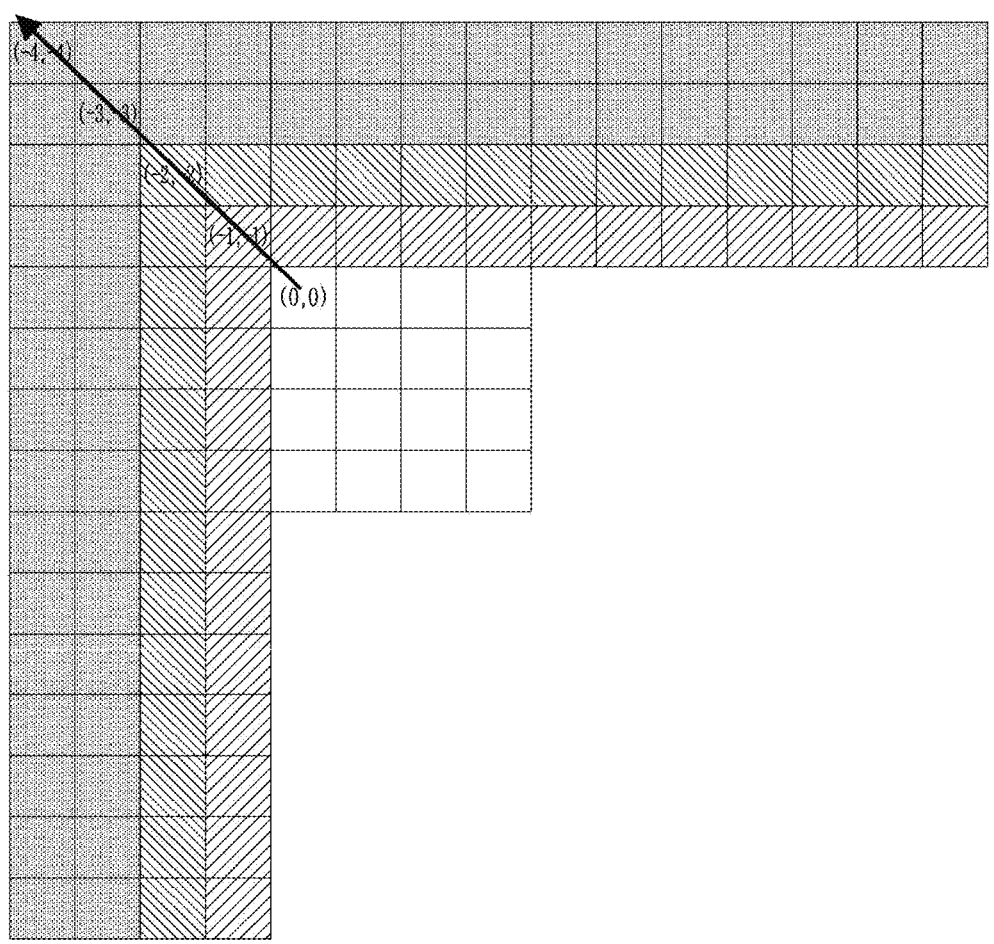
FIG. 9 is an exemplary view depicting neighbor reconstructed sample lines which may be used for intra prediction of a current block.

FIG. 9 is an exemplary view depicting neighbor reconstructed sample lines which may be used for intra prediction of a current block.

A plurality of reconstructed sample lines may be, for example, one or more left and/or top reconstructed sample lines neighboring to a current block. One or more reference samples may be constructed using the one or more reconstructed sample lines. In the example illustrated in FIG. 9, a reference sample may be constructed for intra prediction of a 4×4 current block by selecting at least one of a plurality of left and/or top reconstructed sample lines neighboring to the current block. Herein, left and top reference samples may be constructed, using the same or different reconstructed sample lines. In the example illustrated in FIG. 9, in a directional prediction mode except for the horizontal, vertical, and/or diagonal direction, reference samples may be constructed for the current block, using one or more reconstructed samples on one reconstructed sample line.

For example, in the case where the current block is of size W(width)×H(height), if the position of a top left sample in the current block is (0, 0), a relative position of a top left reference sample closest to the sample position may be set to (−1, −1). To derive a reference sample for the current block, a weighted sum of one or more neighbor reconstructed samples may be used. Herein, the distances from the reconstructed samples to the current block and the directionality of an intra prediction mode of the current block may be taken into account.

For example, when a reference sample is constructed for a current coding block, using one or more reconstructed sample lines neighboring to the current block, the reference sample may be constructed by assigning different weights according to distances from the current block and the directionality of the intra prediction mode of the current block. [Equation 4] below describes an example of constructing a reference sample with a weighted sum, using two reconstructed sample lines neighboring to a current block. The weighted sum may be calculated based on information about the current block (the intra prediction mode, size, shape, and/or division information of the current block) and/or information about a neighbor block (the intra prediction mode, size, shape, and/or division information of the neighbor block). For example, a filter applied to the weighted sum (e.g., a 3-tap filter, a 5-tap filter, a 7-tap filter, and/or an N-tap filter) may be selected, taking into account at least one of the above pieces of information.

$$\text{ref}[-1,-1]=(\text{rec}[-2,-1]+2*\text{rec}[-1,-1]+\text{rec}[-1,-2]+2)>>2$$

$$\text{ref}[x,-1]=(\text{rec}[x,-2]+3*\text{rec}[x,-1]+2)>>2, (x=0 \sim W+H-1)$$

$$\text{ref}[-1,y]=(\text{rec}[-2,y]+3*\text{rec}[-1,y]+2)>>2, (y=0 \sim W+H-1) \qquad \text{[Equation 4]}$$

Or, a reference sample may be constructed using at least one of the mean value, maximum value, minimum value, median value, and most frequent value of a plurality of reconstructed samples, based on at least one of the distances from the current block or the intra prediction mode of the current block. The plurality of reconstructed samples which are used may be filtered reconstructed samples from the same or different reconstructed sample lines.

Or, a reference sample may be constructed based on a change (variation) in the values of a plurality of contiguous reconstructed samples on the same reconstructed sample line and/or reconstructed samples lines different from each other. For example, a reference sample may be constructed based on at least one of whether the difference between the values of two contiguous reconstructed samples is equal to or larger than a threshold, whether the values of the two contiguous reconstructed samples are changed continuously or non-continuously, and so on. For example, if the difference between rec[−1, −1] and rec[−2, −1] is equal to or larger than a threshold, ref[−1, −1] may be determined to be rec[−1, −1], or a value obtained by applying a weighted mean with a predetermined weight assigned to rec[−1, −1]. For example, if as a plurality of contiguous reconstructed samples are nearer to the current bloc, the values of the plurality of contiguous reconstructed samples are changed by n each time, a reference sample, ref[−1, −1] may be determined to be rec[−1, −1]−n.

For example, an intra prediction block for the current coding block may be constructed by assigning different weights according to distances from the current block and/or the directionality, using one or more reconstructed sample lines neighboring to the current block. For example, if the number of the one or more reconstructed sample lines neighboring to the current block is 4, all of the four reconstructed sample lines are available, and an intra prediction direction of the current block is top left diagonal (45 degrees), a prediction sample Pred(0, 0) for the sample position (0, 0) in the current block may be derived using a weighted sum of four reconstructed samples, rec[−4, −4], rec[−3, −3], rec[−2, −2], and rec[−1, −1], as illustrated in FIG. 9. To calculate the weighted sum, the precision of a filter may be selected adaptively according to at least one of information about the current block (the intra prediction mode, size, shape, and/or division information of the current block) and/or information about a neighbor block (the intra prediction mode, size, shape, and/or division information of the neighbor block), as described before. The tap length of the filter applied to calculation of the weighted sum is applied may be equal to or different from the number of the used one or more reconstructed sample lines. In the example illustrated in FIG. 9, for example, Pred(0, 0) may be derived using [Equation 5] below.

$$\text{Pred}(0,0)=(w1*\text{rec}[-4,-4]+w2*\text{rec}[-3,-3]+w3*\text{rec}[-2,-2]+w4*\text{rec}[-1,-1]) \qquad \text{[Equation 5]}$$

In [Equation 5], the sum of weights w1 to w4 may or may not be 1. In addition, each of the weights may be positive or negative. For example, if the precision of the filter used for calculating the weighted sum is 4 bits, shifting may be performed to avoid a rounding error involved in decimal computation. For example, the weight w1 may be 1, the weight w2 may be 2, the weight w3 may be 5, and the weight w4 may be 8 in [Equation 6] below. Further, a shift of 4 and an offset of 8 (1<<(shift−1)) may be applied.

$$\text{Pred}(0,0)=(w1*\text{rec}[-4,-4]+w2*\text{rec}[-3,-3]+w3*\text{rec}[-2,-2]+w4*\text{rec}[-1,-1]+\text{offset})>>\text{shift} \qquad \text{[Equation 6]}$$

For example, before the prediction sample is constructed, reference sample filtering may be performed on the one or more reconstructed samples rec[−1, −1], rec[−2, −2], rec[−3, −3], and rec[−4, −4] from each reconstructed sample line or reconstructed sample lines different each other, and a weighted sum may be calculated using the filtered values. Herein, the reference sample filtering may be performed by selectively applying any filter (e.g., at least one of a 3-tap filter, a 5-tap filter, a 7-tap filter, and an N-tap filter) based on at least one of information about the current block (the intra prediction mode, size, shape, and/or division information of the current block) and/or information about a neighbor block (the intra prediction mode, size, shape, and/or division information of the neighbor block).

For example, when a prediction sample is constructed using one or more reconstructed sample lines neighboring to the current block, the prediction sample may be constructed using at least one of the mean value, maximum value, minimum value, median value, or most frequency value of one or more reconstructed samples on a reconstructed sample line in consideration of the distances from the current block and/or the directionality according to the intra prediction mode. Herein, for the reconstructed samples on the plurality of reconstructed samples lines used, reference sample filtering is performed on each reconstructed sample line or reconstructed sample lines different from each other, and the mean value, maximum value, minimum value, median value, or most frequency value for generating the prediction block may be performed by using the filtered values.

For example, after a reconstructed block most similar to the current block is detected from neighbor reconstructed samples rec[m, n], intra prediction may be performed using information acquired from the reconstructed block. At least one piece of position information (m, n) about the block most similar to the current block may be entropy-encoded/decoded, or may be implicitly derived by performing the same operation in the decoder and the encoder.

For example, a prediction block most similar to the current block may be predicted from reconstructed samples, and a residual signal for the current block may be generated using the difference between the current block and the prediction block most similar to the current block, detected from the neighbor reconstructed samples.

For example, after a prediction block most similar to the current block is derived from reconstructed samples, one or more reconstructed sample lines neighboring to the derived reconstructed samples may be used as reference samples for the current block. Or a reference sample for the current block may be derived using at least one of one or more reference sample lines for the current block and one or more reference sample lines neighboring to the prediction block most similar to the current block.

For example, a reference sample for the current coding block may be constructed using a weighted sum of one reference sample line determined to be best among one or more reference sample lines available for the current block and one reference sample line determined to be best among one or more reference sample lines neighboring to a prediction block most similar to the current block, derived from reconstructed samples.

For example, a top reference sample for the current block may be constructed from one reference sample line selected from among one or more reference sample lines available for the current block. Further, a left reference sample for the current block may be constructed from one reference sample line selected from among one or more reference sample lines neighboring to the prediction block most similar to the current block, derived from the reconstructed samples. The selected one reference sample line may be a reference sample line determined to be best among one or more reference sample lines.

For example, a first residual signal may be acquired by performing intra prediction for the current block, a second residual signal may be acquired by applying a best intra prediction mode obtained from the intra prediction to the prediction block most similar to the current block, derived from the reconstructed samples, and a residual signal for the current block may be generated using the difference between the first residual signal and the second residual signal.

The length of a reference sample line may be different for each reconstructed sample line. For example, reconstructed sample line n may be constructed to be longer or shorter than reconstructed sample line n−1 by m samples.

Or, each of the reference sample lines may be reconstructed by a shift according to an intra prediction mode. For example, in the absence of a reference sample at a position referenced by an intra prediction mode, a corresponding reference sample line may be shifted so that a reference sample may be present at the position. Which reference sample line to be shifted or by how much may be determined based on an intra prediction mode, a prediction angle, and/or the position of a reference sample line.

As described above, information indicating whether to construct a reference sample using only the closest reference sample line or a plurality of reference sample lines may be encoded/decoded. For example, the information may be encoded/decoded at at least one of a sequence level, a picture level, a slice level, a tile level, a CTU level, a CU level, a PU level, and a TU level. In addition, information about the availability of a plurality of reference sample lines may be signaled at a higher level.

A reference sample may be selected for intra prediction of the current block. For example, left and/or top reference samples immediately neighboring to the current block may be used. Or, best reference samples may be constructed for the current block by searching all available reconstructed samples located in an already reconstructed left column and/or top row.

Figure 10:
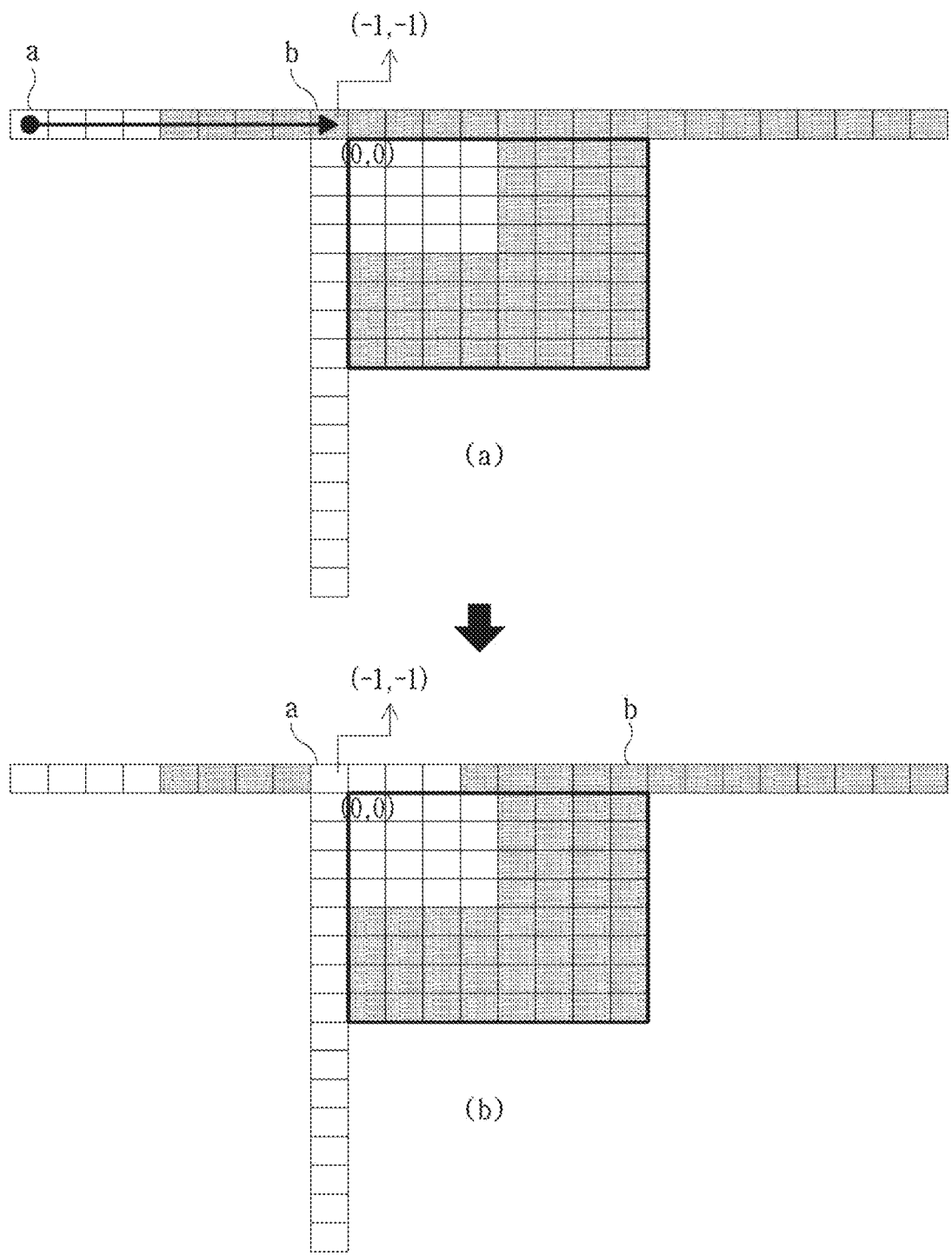
FIG. 10 is a view depicting an embodiment of reconstructing reference samples.

FIG. 10 is a view depicting an embodiment of reconstructing reference samples. In FIG. 10, a part surrounded by a bold line represents a current block. Further, each grid represents one sample, and the shade of the grid may represent the sample value of the sample. That is, grids with similar shades may correspond to samples having similar sample values.

As illustrated in (a) of FIG. 10, a reference sample above the current block may have a relatively low correlation with the current block. In this case, reference samples having high correlations with the current block may be detected from among all available reconstructed samples located in a row above the current block. Top reference samples for the current block or all reference samples required for intra prediction of the current block may be reconstructed, using the detected reference samples having high correlations. In the example illustrated in (a) of FIG. 10, reference samples at position a to position b in the top row may be detected as reference samples having high correlations. Then, as illustrated in (b) of FIG. 10, top reference samples for the current block may be reconstructed by shifting the detected reference samples having high correlations.

In the example illustrated in FIG. 10, information about reference sample shifting (i.e., information about horizontal shifting) may have a positive or negative integer value. In addition, a default value for the information about reference sample shifting may be 0. The information about reference sample shifting may be encoded/decoded or may be implicitly derived in the encoder/decoder.

For example, in the case where the position of a top left sample in the current block is (0, 0), if best top reference samples are located to the left of a position (−1, −1), the information about reference sample shifting may have a negative value. Further, if best top reference samples are located to the right of the position (−1, −1), the information about reference sample shifting may have a positive value. Or, the information may have negative and positive signs in the opposite manner to the above cases. Further, the negative and positive signs may be determined based on any reference sample other than the position (−1, −1).

A unit for shifting reference samples may be determined according to at least one piece of coding information from among the intra prediction mode, block size, and shape of the current block and/or a neighbor block, and/or the size, shape, and/or division information of a transform unit. For example, a reference sample may be shifted in units of one pixel or any number of pixels.

For example, if a relative position of a top left sample in a current block is (0, 0), best top reference samples for the current block may be constructed using a predetermined unit within a search range with respect to (−1, −1). The predetermined unit may be at least one of one pixel and a unit based on a block size. The block size-based unit may be, for example, ½ or ¼ of the block size. Further, the block may be of any type of block including a transform block. The search range may be an area including all of top reconstructed samples available for the current block. Or the search range may be predefined in the encoder/decoder. Or information about the search range may be encoded/decoded, or may be implicitly derived in the same manner in the encoder/decoder.

For example, the current block may be of size 8×8, and the shifting unit may be ½ of the current block size, that is, 4. In this case, the encoder/decoder may reconstruct best top reference samples by shifting four pixels each time within a configured search range. Herein, for example, to encode a shift of one unit of pixels (four pixels), information about reference sample shifting may have a value of 1. For example, to encode a shift of two units of pixels (8 pixels), the information about reference sample shifting may have a value of 2.

For example, the current block may be of size 8×8, and the shifting unit may be ¼ of the current block size, that is, 2. In this case, the encoder/decoder may reconstruct best top reference samples by shifting two pixels each time within a configured search range. Herein, for example, to encode a shift of one unit of pixels (two pixels), the information about reference sample shifting may have a value of 1.

Figure 11:
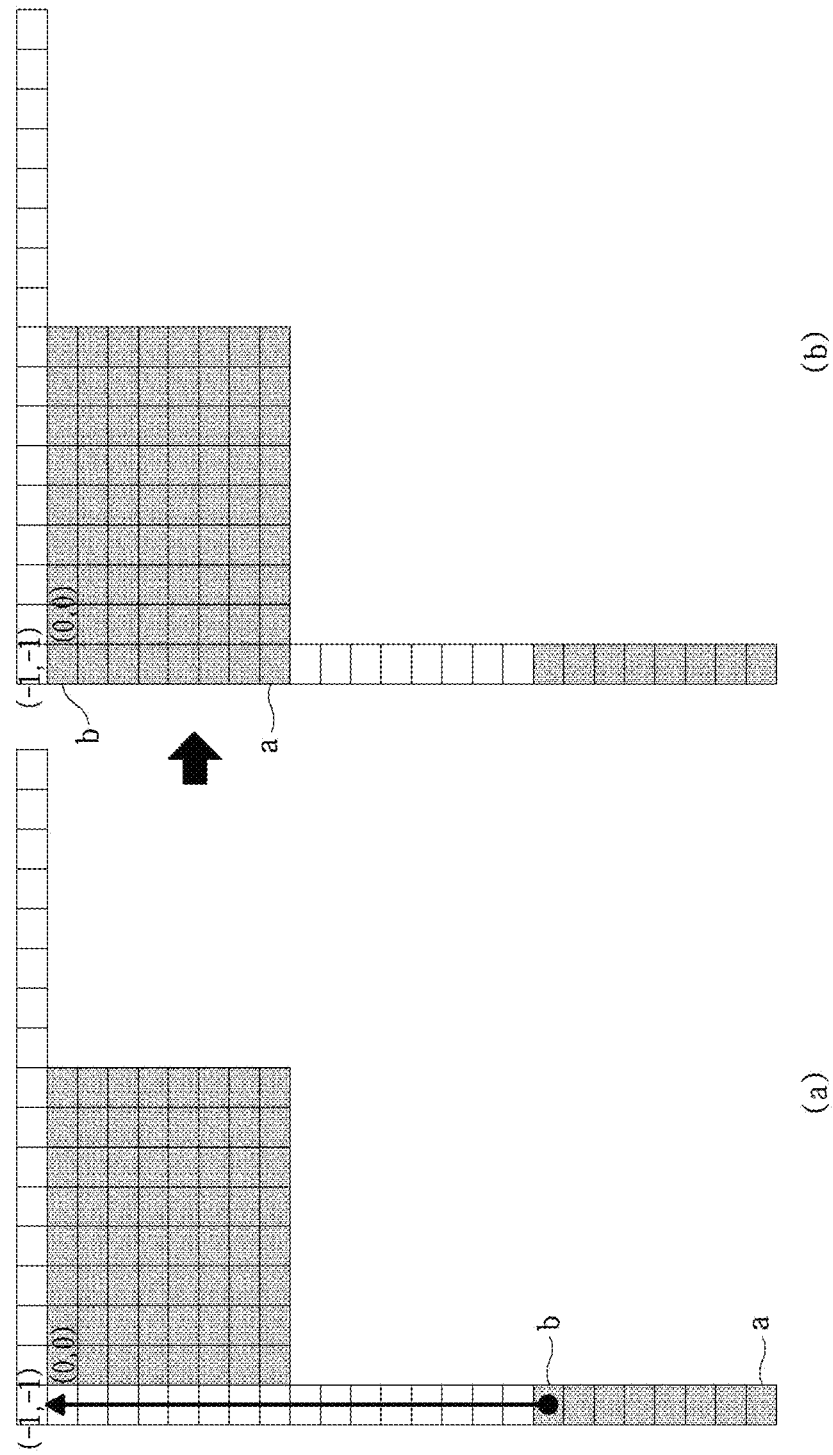
FIG. 11 is a view depicting another embodiment of reconstructing reference samples.

FIG. 11 is a view depicting another embodiment of reconstructing reference samples. In FIG. 11, a part surrounded by a bold line represents a current block. Further, each grid represents one sample, and the shade of the grid may represent the sample value of the sample. That is, grids with similar shades may correspond to samples having similar sample values.

As illustrated in (a) of FIG. 11, a reference sample located at a left side of the current block may have a relatively low correlation with the current block. In this case, reference samples having high correlations with the current block may be detected from among all available reconstructed samples located in a left column of the current block. Left reference samples for the current block or all reference samples required for intra prediction of the current block may be reconstructed, using the detected reference samples having high correlations. In the example illustrated in (a) of FIG. 10, reference samples at position a to position b in the left column may be detected as reference samples having high correlations. Then, as illustrated in (b) of FIG. 10, left reference samples for the current block may be reconstructed by shifting the detected reference samples having high correlations.

In the example illustrated in FIG. 10, information about reference sample shifting (i.e., information about vertical shifting) may have a positive or negative integer value. In addition, a default value for the information about reference sample shifting may be 0. The information about reference sample shifting may be encoded/decoded or may be implicitly derived in the encoder/decoder.

For example, in the case where the position of a top left sample in the current block is (0, 0), if best top reference samples are located to the above of a position (−1, −1), the information about reference sample shifting may have a negative value. Further, if best top reference samples are located to the below of the position (−1, −1), the information about reference sample shifting may have a positive value. Or, the information may have negative and positive signs in the opposite manner to the above cases. Further, the negative and positive signs may be determined based on any reference sample other than the position (−1, −1).

A unit for shifting reference samples may be determined according to at least one piece of coding information from among the intra prediction mode, block size, and shape of the current block and/or a neighbor block, and/or the size, shape, and/or division information of a transform unit. For example, a reference sample may be shifted in units of one pixel or any number of pixels.

For example, if a relative position of a top left sample in a current block is (0, 0), best left reference samples for the current block may be constructed using a predetermined unit within a search range with respect to (−1, −1). The predetermined unit may be at least one of one pixel and a unit based on a block size. The block size-based unit may be, for example, ½ or ¼ of the block size. Further, the block may be of any type of block including a transform block. The search range may be an area including all of left reconstructed samples available for the current block. Or the search range may be predefined in the encoder/decoder. Or information about the search range may be encoded/decoded, or may be implicitly derived in the same manner in the encoder/decoder.

For example, the current block may be of size 8×8, and the shifting unit may be ½ of the current block size, that is, 4. In this case, the encoder/decoder may reconstruct best left reference samples by shifting four pixels each time within a configured search range. Herein, for example, to encode a shift of one unit of pixels (four pixels), information about reference sample shifting may have a value of 1. For example, to encode a shift of two units of pixels (8 pixels), the information about reference sample shifting may have a value of 2.

For example, the current block may be of size 8×8, and the shifting unit may be ¼ of the current block size, that is, 2. In this case, the encoder/decoder may reconstruct best left reference samples by shifting two pixels each time within a configured search range. Herein, for example, to encode a shift of one unit of pixels (two pixels), the information about reference sample shifting may have a value of 1.

The shifting of a reference sample for the current block may be applied to either available reconstructed samples located in an upper row or available reconstructed samples located in a left column. Or, the shifting may be applied to both available reconstructed samples located in an upper row and available reconstructed samples located in a left column. Or, the shifting of a reference sample may be applied to at least one signal component among a luma component and a chroma component.

The shifting of a reference sample for the current block may be applied to an available reconstructed sample located at a left side and/or an upper side, simultaneously. For example, a shifting of a positive direction, based on the same shifting information, may mean a shifting to a right direction of a reconstructed sample located at an upper side, and a shifting to an upper direction of a reconstructed sample located at a left side.

When reconstructing a reference sample for the current block using one or more reconstructed sample lines neighboring to the current block, a reconstruction of a reference sample by the shifting of a reference sample may also be applied.

For example, when reconstructing a reference sample for the current block using one or more reconstructed sample lines, for each of the reconstructed sample lines, the shifting of a reference sample according to the present invention may be applied to at least one among an upper direction and a left direction to reconstruct a reference sample. An encoder may construct a reference sample for the current block from any reconstructed sample line which makes a RD base cost function be the smallest.

For example, when reconstructing a reference sample for the current block using one or more reconstructed sample lines, a reference sample may be reconstructed by applying the shifting of a reference sample within an area configured by one or more reconstructed sample lines. For example, when an upper and/or a left reconstructed sample is available up to four lines, optimal upper and/or left reference sample for the current block may be searched within an area configured by four reconstructed sample lines. In this case, information (e.g., motion information) according to a shift of a horizontal and/or vertical direction may be encoded/decoded to be transmitted, or may be derived implicitly at an encoder/decoder.

When a reference sample for the current block is reconstructed using one or more reconstructed sample lines, reference samples to be reconstructed may be divided by an arbitrary unit (pixel or any block size unit), and reconstructed from a different reconstructed sample line for each unit (interval).

When shifting a reference sample at an arbitrary position (an upper side or a left side), in case all reference samples required for the current block are available at the shifted position, the shifting of a reference sample may be performed. Or, in case all or a part of reference samples required for the current block are unavailable at the shifted position, the shifting of a reference sample may be performed after padding the unavailable reference samples using an available reference sample in a neighbor. For example, all or a part of reference samples are located outside of boundary of a picture, a tile, a slice, a CTU and/or a CU, the corresponding reference samples may be determined to be unavailable.

After constructing reference samples for intra prediction for the current coding block, reference samples for the current coding block may be reconstructed by exchanging and/or replacing reference samples in the unit of one or more reference samples.

Figure 12:
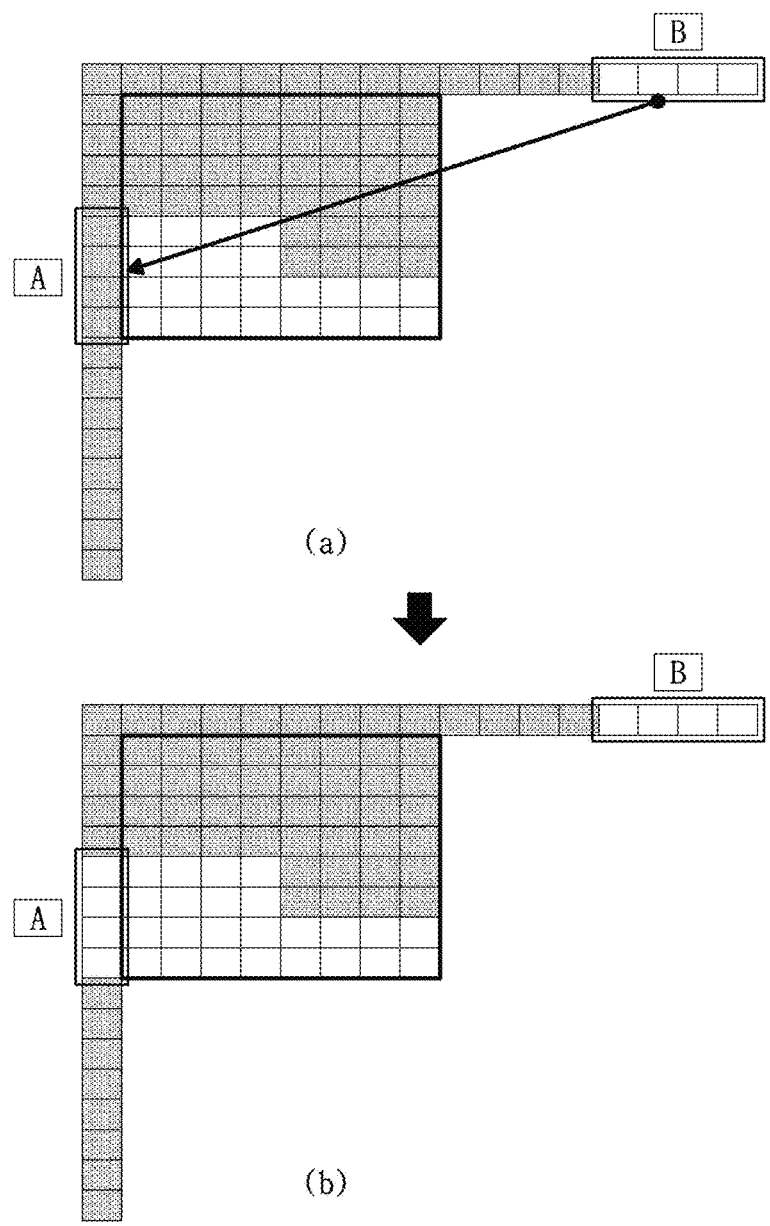
FIG. 12 is a view depicting another embodiment of reconstructing reference samples.

FIG. 12 is a view depicting another embodiment of reconstructing reference samples. In FIG. 12, a part surrounded by a bold line represents a current block. Further, each grid represents one sample, and the shade of the grid may represent the sample value of the sample. That is, grids having similar shades may correspond to samples having similar sample values.

As illustrated in (a) of FIG. 12, after reference samples are constructed, the reference samples of parts A and B each including four pixels may be subjected to exchange or replacement. For example, the reference samples may be exchanged or replaced in order to reconstruct reference samples having high correlations with the current block. For example, as illustrated in (b) of FIG. 12, the values of part A may be replaced with the values of part B. Or the reference samples of part A may be exchanged with the reference samples of part B.

In intra prediction of the current block, the current block may be divided into one or more prediction blocks according to the size and/or shape of the current block. As the same reference sample is referred to for the prediction blocks, intra prediction of one or more prediction blocks in the current block may be performed in parallel.

Figure 13:
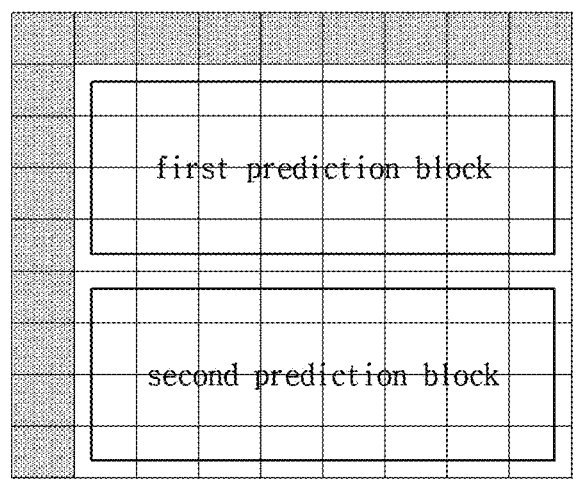
FIG. 13 is a view depicting an embodiment of encoding/decoding a plurality of prediction blocks generated by dividing a current block.

FIG. 13 is a view depicting an embodiment of encoding/decoding a plurality of prediction blocks generated by dividing a current block.

As illustrated in FIG. 13, an 8×8 current block may be divided into two 8×4 prediction blocks. In intra prediction of each prediction block, intra prediction may be performed for a second prediction block, using the same reference samples as top reference samples used for a first prediction block. As a result, intra coding/decoding of the first and second prediction blocks may be performed simultaneously.

Figure 14:
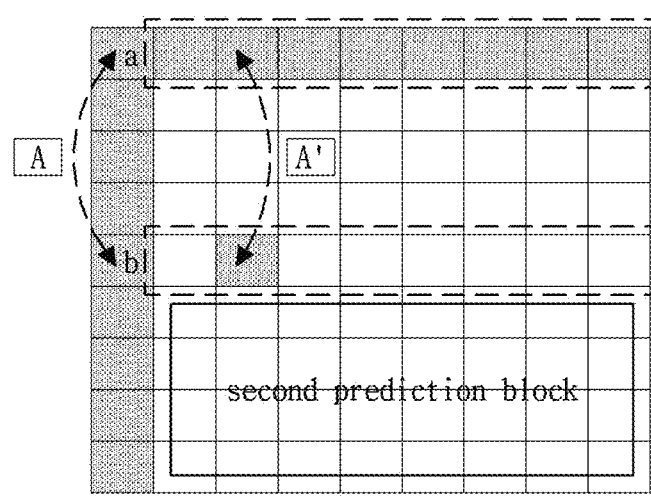
FIG. 14 is a view depicting another embodiment of encoding/decoding a plurality of prediction blocks generated by dividing a current block.

FIG. 14 is a view depicting another embodiment of encoding/decoding a plurality of prediction blocks generated by dividing a current block.

In the example illustrated in FIG. 13, the top reference samples for the first prediction block may have low correlations with the second prediction block. Considering this, after the top reference samples for the first prediction block are compensated, the compensated top reference samples are referred to as top reference samples for the second prediction block, in the example illustrated in FIG. 14. For example, as illustrated in FIG. 14, the second prediction block may be encoded/decoded based on reference samples obtained by compensating the top reference samples used for the first prediction block. Herein, a compensation value used for the compensation may be calculated from neighbor reconstructed samples. For example, the compensation value may be the difference, A between left reconstructed samples a and b (A=a−b). The compensation value may be used as it is, or after it is scaled to any size according to the same rule in the encoder/decoder.

The foregoing method is also available in the case where intra prediction is performed in parallel for one or more blocks. For example, on the assumption that each of the prediction blocks illustrated in FIGS. 13 and 14 is a (8×4) block, intra prediction may be performed in parallel, using the same reference samples according to the foregoing method.

If intra prediction is performed in parallel for one or more blocks, top right samples of a second prediction block (or a lower block) may not be available. In this case, top right reference samples of a first prediction block (or an upper block) may be replicated. Or reference samples for the second prediction block (or the lower block) may be derived by compensating the top right reference samples of the first prediction block (or the upper block). A compensation value used for the compensation may be a difference A or scaled difference A' calculated from neighbor reconstructed samples.

In the example described with reference to FIG. 14, neighbor reconstructed samples used for calculation of the compensation value and/or a scaling factor used for the scaling may be determined based on the shape, size, and/or position of the current block, the first prediction block, and/or the second prediction block, the position of an arbitrary standard sample, and/or the position of a currently predicted sample.

FIGS. 13 and 14 illustrate cases in which a current block is divided horizontally. However, the current block may be divided vertically into one or more prediction blocks. If the current block is divided vertically into prediction blocks and each prediction block is processed in parallel, left reference samples for a second prediction block may be derived from left reference samples of a first prediction block, in a similar manner to that described with reference to FIGS. 13 and 14. In this case, the left reference samples of the first prediction block may also be compensated. Further, a compensation value used for the compensation may be a horizontal difference or scaled difference between neighbor reconstructed samples.

After reference samples are constructed in the afore-described various methods, a coding mode having a minimum cost function value according to rate-distortion optimization may be determined to be an intra prediction mode for the current block.

Information indicating that a reference sample and/or a prediction sample has been constructed in at least one of the afore-described various methods may be encoded/decoded, or may be implicitly derived in the encoder/decoder. If information about reference sample shifting is explicitly encoded/decoded, at least one of the following entropy encoding methods may be used. In addition, after the entropy-encoded information is binarized, the binarized information may be finally encoded/decoded by CABAC(ae (v)).

Truncated Rice binarization method
K-th order Exp_Golomb binarization method
Limited K-th order Exp_Golomb binarization method
Fixed-length binarization method
Unary binarization method
Truncated Unary binarization method In selecting the reference sample, a decision as to the availability of a block including the reference sample and/or padding may be performed. For example, if the block including the reference sample is available, the reference sample may be used. Meanwhile, if the block including the reference sample is not available, the unavailable reference sample may be replaced with one or more available neighbor reference samples by padding.

If the reference sample exists outside at least one of a picture boundary, a tile boundary, a slice boundary, a CTB boundary, and a predetermined boundary, it may be determined that the reference sample is not available.

In the case where the current block is encoded by CIP (constrained intra prediction), if the block including the reference sample is encoded/decoded in an inter prediction mode, it may be determined that the reference sample is not available.

Figure 15:
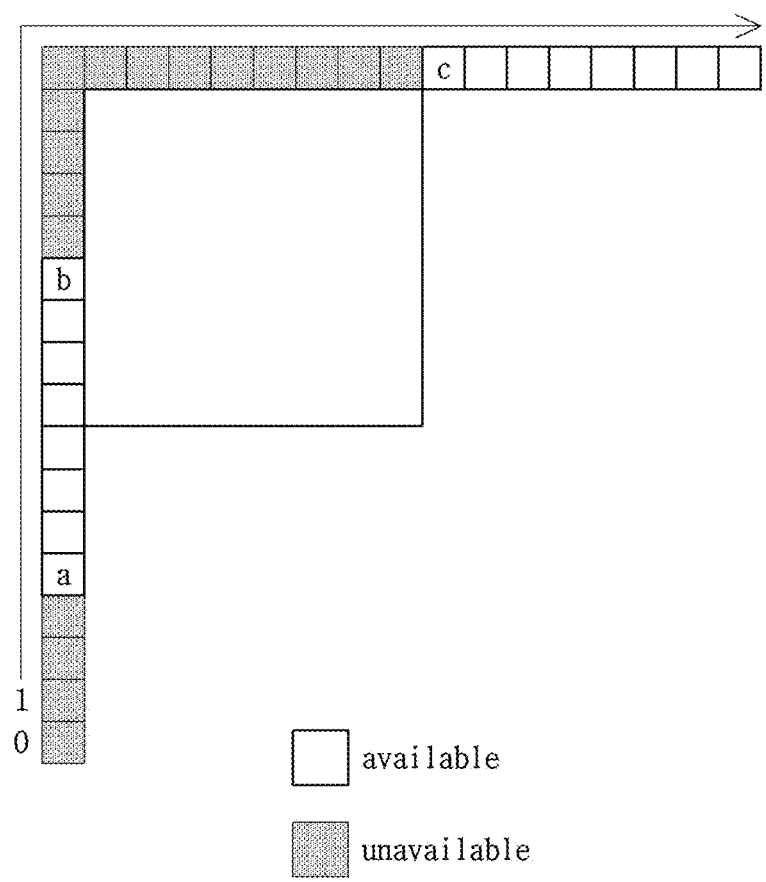
FIG. 15 is a view depicting a method for replacing an unavailable reconstructed sample, using an available reconstructed sample.

FIG. 15 is a view depicting a method for replacing an unavailable reconstructed sample, using an available reconstructed sample.

If it is determined that the neighbor reconstructed sample is unavailable, the unavailable sample may be replaced, using a neighbor available reconstructed sample. For example, as illustrated in FIG. 15, in the presence of available samples and unavailable samples, an unavailable sample may be replaced, using one or more available samples.

The sample value of an unavailable sample may be replaced with the sample value of an available sample in a predetermined order. An available sample adjacent to an unavailable sample may be used to replace the unavailable sample. In the absence of an adjacent available sample, the first appearing available sample or the closest available sample may be used. A replacement order of unavailable samples may be a left lowermost to right uppermost order. Or the replacement order of unavailable samples may be a right uppermost to left lowermost order. Or the replacement order of unavailable samples may be a left uppermost to right uppermost and/or left lowermost order. Or the replacement order of unavailable samples may be a right uppermost and/or left lowermost to left uppermost order.

As illustrated in FIG. 15, unavailable samples may be replaced in an order from a left lowermost sample position 0 to a right uppermost sample. In this case, the values of the first four unavailable samples may be replaced with the value of the first appearing or closest available sample a. The values of the next 13 unavailable samples may be replaced with the value of the last available sample b.

Or, an unavailable sample may be replaced, using a combination of available samples. For example, the unavailable sample may be replaced using the mean value of available samples adjacent to both ends of the unavailable sample. For example, in FIG. 15, the first four unavailable samples may be filled with the value of the available sample a, and the next 13 unavailable samples may be filled with the mean value of the available sample b and an available sample c. Or, the 13 unavailable samples may be filled with any value between the values of the available samples b and c. In this case, the unavailable samples may be replaced with difference values. For example, as an unavailable sample is nearer to the available sample a, the value of the unavailable sample may be replaced with a value close to the value of the available sample a. Similarly, as an unavailable sample is nearer to the available sample b, the value of the unavailable sample may be replaced with a value close to the value of the available sample b. That is, the value of an unavailable sample may be determined based on the distance from the unavailable sample to the available sample a and/or b.

To replace an unavailable sample, one or more of a plurality of methods including the above methods may be selectively applied. A method for replacing an unavailable sample may be signaled by information included in a bitstream, or a method predetermined by an encoder and a decoder may be used. Or the method for replacing an unavailable sample may be derived by a predetermined scheme. For example, a method for replacing an unavailable sample may be selected based on the difference between the values of the available samples a and b and/or the number of unavailable samples. For example, a method for replacing an unavailable sample may be selected based on a comparison between the difference between the values of two available samples and a threshold and/or a comparison between the number of unavailable samples and a threshold. For example, if the difference between the values of the two available samples is larger than the threshold and/or if the number of unavailable samples is larger than the threshold, the values of unavailable samples may be replaced with different values.

A method for replacing an unavailable sample may be selected on a predetermined unit basis. For example, a method for replacing an unavailable sample may be selected on the basis of at least one of, for example, a video, a sequence, a picture, a slice, a tile, a CTU, a CU, a PU, and a TU. Herein, selection of a method for replacing an unavailable sample may be based on information signaled on the predetermined unit basis or derived on the predetermined unit basis. Or a method predetermined by an encoder and a decoder may be applied.

Figure 16:
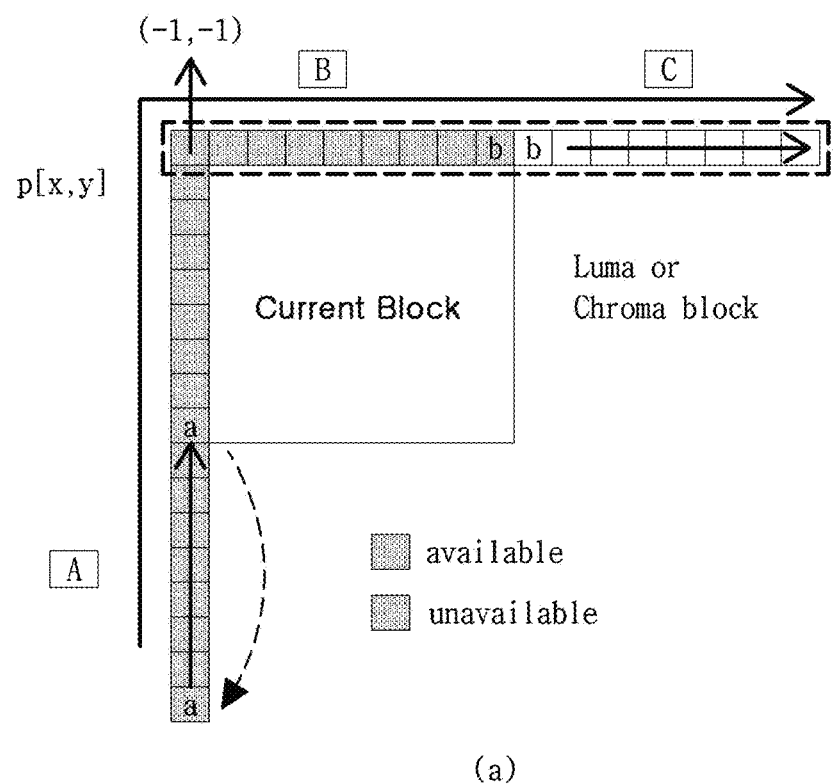
FIG. 16 is a view depicting another method for replacing unavailable reconstructed samples, using available reconstructed samples.
Figure 16:
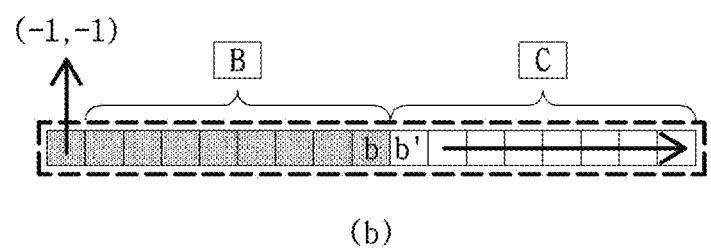

FIG. 16 is a view depicting another method for replacing unavailable reconstructed samples, using available reconstructed samples.

In the example illustrated in FIG. 16, a current block is of size 8×8, and eight samples included in block C to the top right of the current block, among top reference samples are unavailable. As illustrated in (a) of FIG. 16, the values of the 8 unavailable samples may be replaced with the sample value b of an available sample closest to the eight unavailable samples. Or as illustrated in (b) of FIG. 16, the values of the eight unavailable samples may be replaced with a value b', instead of the value b.

The value b' may be derived, for example, based on the gradient of reference samples included in block B. To calculate the value b', for example, the following pseudo code may be used.

TABLE 1

After the average, avg. of reference samples included in block B is calculated, b' is derived in consideration of a gradient with respect to the value b.

(1) Compute avg.
(2) delta = avg. − b
(3) if (delta > 0) b' = b − scaled_delta
(4) if (delta < 0) b' = b + scaled_delta
(5) Else, perform by the conventional method First, the average of the reference samples included in block B may be calculated. If the current block is of size 8×8, eight reconstructed samples above the current block may be used in calculating the average. Subsequently, b' may be derived in consideration of the gradient between the calculated average and the sample value b.

After the difference, delta between the calculated average and the sample value b is calculated, if the difference, delta is larger than 0, it may be considered that the values of the eight reference samples included in block B are gradually decreased. Therefore, b' may be derived by reflecting the decrement in the sample value b. If the difference, delta is less than 0, it may be considered that the values of the eight reference samples included in block B are gradually increased. Therefore, b' may be derived by reflecting the increment in the sample value b.

The average, avg. in the pseudo code may be the average of as many available reference samples as the width of the current block. That is, in FIG. 16, avg. may be the average of the eight reference samples included in block B. However, the number of reference samples used in calculating an average is not limited thereto. For example, in FIG. 16, the average may be calculated using at least one of the eight reference samples included in block B. For example, avg. may be the average of K available reference samples in the vicinity of the unavailable reference samples. For example, the average may be calculated only from four right reference samples among the eight reference samples included in block B.

Further, the sample value b of one available reference sample is used to calculate the difference, delta in the pseudo code, which should not be construed as limiting. For example, the difference, delta may be calculated using at least one of the eight reference samples included in block B. For example, the at least one reference sample used to calculate the difference, delta may be P available reference samples in the vicinity of the unavailable reference samples. For example, the average of the P reference samples may be used as the difference, delta. The number P of available reference samples used to calculate the difference, delta may be less than the number K of available reference samples used to calculate the average.

Further, any other statistic value may be used instead of the average of K available reference samples and/or the average of P available reference samples used to derive the difference, delta. The statistic value may be at least one of, for example, a weighted mean value, a maximum value, a minimum value, a median value, or a most frequent value. If a weighted mean value is used, weights may be determined based on the position of each of the available reference sample and/or the unavailable reference samples. For example, the weights may be inversely proportional to the distance between the available reference sample and the unavailable reference sample.

The value b' may be calculated by compensating the sample vale b of the available reference sample for a gradient corresponding to the difference, delta. A compensation value used for the compensation may be the difference, delta or a value, scaled_delta, obtained by scaling the difference, delta using a scaling factor. The value scaled_delta may be larger or less than delta.

In the example illustrated in (a) of FIG. 16, the values of eight unavailable reference samples located to the bottom left of the current block may be replaced with the sample value a of an available reference sample. Or the values of the eight unavailable reference samples located to the bottom left of the current block may be replaced with a sample value a' according to the method described with reference to (b) of FIG. 16. These methods may be applied to all of top and left reference samples or only to a direction. The direction to which the methods are applied may be determined based on coding information specifying the size, shape, and intra prediction mode of the current block.

Further, in the example illustrated in FIG. 16, the values of the top right or bottom left unavailable reference samples may be replaced uniformly with the value a' or b'. Or, different values may be applied to the unavailable reference samples by gradually scaling an initially obtained difference, delta.

In the case where at least one reconstructed sample line neighboring to a current block is used, the padding method may also be adaptively applied.

Figure 17:
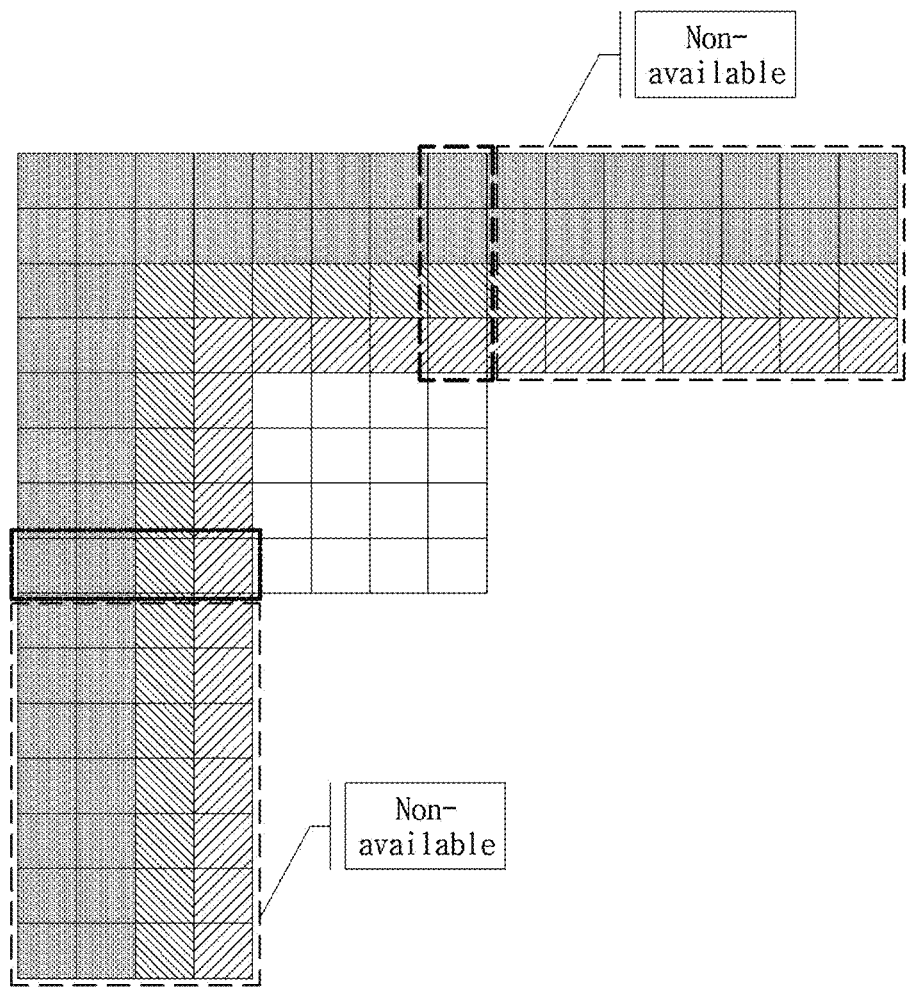
FIG. 17 is an exemplary view depicting padding of reference samples in the case where one or more reconstructed sample lines are used.

FIG. 17 is an exemplary view depicting padding of reference samples in the case where one or more reconstructed sample lines are used.

If reference samples are generated for a current coding block, using a plurality of (e.g., up to 4) reconstructed sample lines, top right or bottom left reference samples on each reconstructed sample line may not be available. After reference samples are generated for the unavailable reference samples in the foregoing method, a reconstructed sample line which is optimal in terms of RD may be set as reference samples for the current block.

In the example illustrated in FIG. 17, in the case where reference samples are generated for a current block using up to 4 reconstructed sample lines, the reconstructed samples of dotted boxes may not be available. Reference samples may be generated for the positions of the unavailable top right or bottom left reconstructed samples, using information of outermost available reconstructed samples (reconstructed samples in a bold solid lined box) among available reconstructed samples on the four reconstructed sample lines.

For example, in order to generate unavailable reference samples located at a top right of the current block, at least one of four available reconstructed samples in a bold solid lined box to the top right of the current block may be used. For example, the non-reference samples may be padded by using at least one of the maximum value, minimum value, median value, mean value, weighted mean value, and most frequent value of N available reconstructed samples in the top right bold solid lined box. N may be, for example, 4.

Similarly, at least one of four available reconstructed samples in a bold solid lined box to the bottom left of the current block may be used for unavailable reference samples to the bottom left of the current block.

Or, in the example illustrated in FIG. 17, one or more available reference samples including or not including an available reconstructed sample in a bold solid lined box may be used for generating the unavailable reference samples.

For the constructed one or more reference samples, whether to apply filtering and/or a filtering type may be determined in a different manner based on at least one of the intra prediction mode, size, and/or shape of the current block. And, the filtering may be applied to at least one component among a luma and chroma component.

For the plurality of reference sample lines, for example, it may be determined differently whether to apply filtering. For example, filtering may be applied to a first adjacent reference sample line, and filtering may not be applied to a second adjacent reference sample line.

Further, for example, both a filtered value and a non-filtered value may be used for the same reference sample. For example, at least one different one of a 3-tap filter, a 5-tap filter, a 7-tap filter, and an N-tap filter may be selected and applied according to at least one of an intra prediction mode, and the size and/or shape of the current block. Herein, N may be an integer.

For example, in the case where the values of unavailable samples are replaced with the same value by using the value of a neighbor available reference sample, in spite of reference sample filtering, the filtered reference sample values of the reference samples whose values are replaced with the same value may all be equal. Further, since the filtered reference sample values are equal, if intra prediction is performed for the current block, using a weighted sum of the reference sample values, the same prediction sample value may always be achieved. In the above case, therefore, the computation volume of the encoder/decoder may be reduced by skipping the reference sample filtering operation and/or the operation of deriving a prediction sample value.

Figure 18:
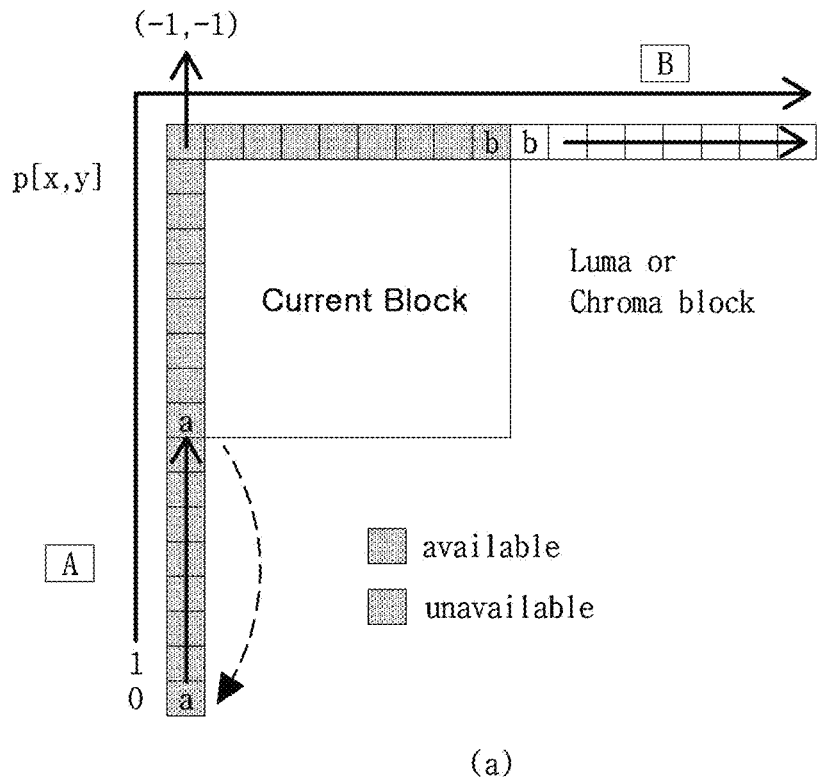
FIG. 18 is a view depicting filtering of reference samples including padded unavailable reference samples.
Figure 18:
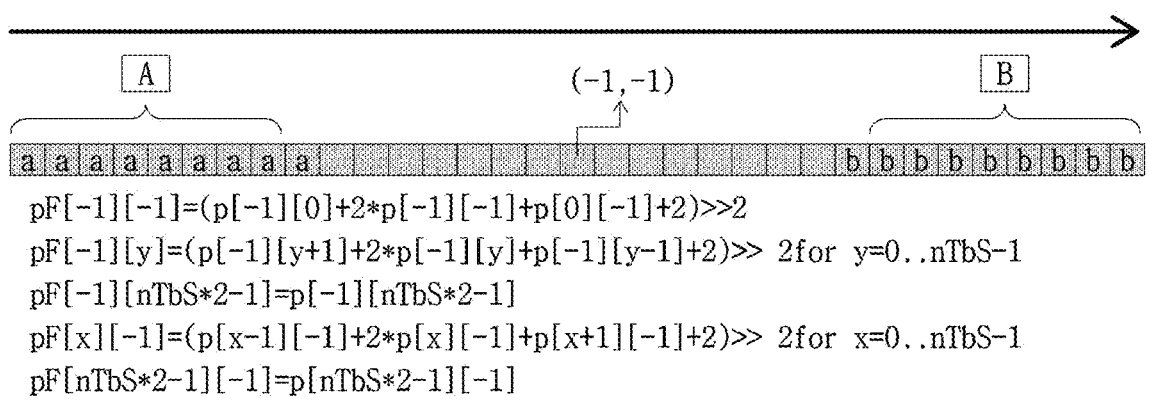

FIG. 18 is a view depicting filtering of reference samples including padded unavailable reference samples.

As illustrated in (a) of FIG. 18, bottom left and top right unavailable reference samples for the current block may be padded by any values. In FIG. 18, the position of a top left sample neighboring to the current block is (−1, −1). (b) of FIG. 18 illustrates the neighbor bottom left and top right reference samples in a one-dimensional array. The padded bottom left and top right reference samples may not be filtered, among the reference samples of the one-dimensional array illustrated in (b) of FIG. 18. Herein, the padded bottom left samples are included in block A, and the padded top right samples are included in block B. The remaining samples except for the padded bottom left and top right reference samples may be filtered. As described before, at least one different filter may be selected from among a 3-tap filter, a 5-tap filter, a 7-tap filter, and an N-tap filter according to at least one of information about the current block and/or information about a neighbor block (an intra prediction mode, a block size, a block shape, the size of a transform unit, and/or division information). Herein, N may be an integer. In the example described with reference to FIG. 18, the size of the one-dimensional array is (4*nTbs+1) where nTbs may be the width or height of the current block or the transform block.

Figure 19:
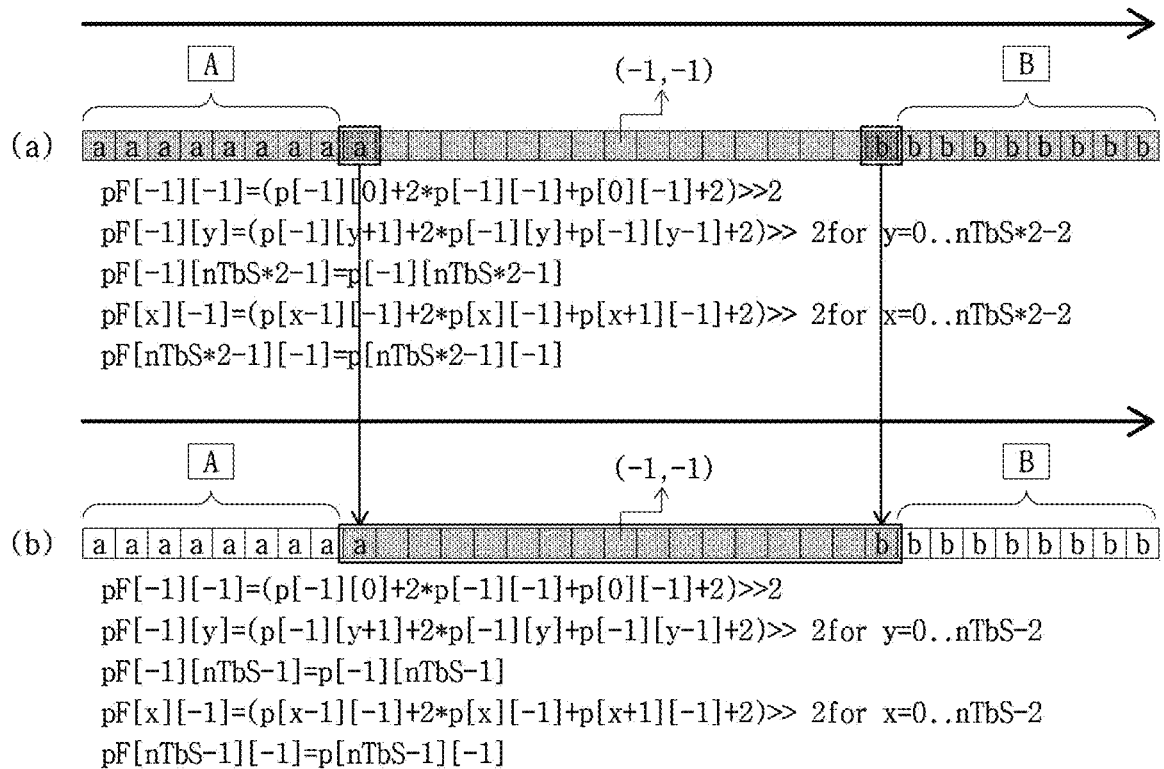
FIG. 19 is a view depicting filtering of reference samples including an unavailable reference sample.

FIG. 19 is a view depicting filtering of reference samples including an unavailable reference sample. For example, if a current block is of size 8×8, and left bottom reference samples included in block A and top right reference samples in block B are unavailable, the unavailable reference samples may be replaced with the same values, using the values of neighbor available reference samples.

(a) of FIG. 19 illustrates an example of filtering all reference samples including padded reference samples, and (b) of FIG. 19 illustrates an example of filtering reference samples except for padded reference samples.

As illustrated in (b) of FIG. 19, the reference samples replaced with the same values may not be subjected to reference sample filtering. Herein, reference sample filtering may be applied only to the remaining reference samples except for the reference samples of block A or block B. Or, reference sample filtering may be applied only to reference samples other than a leftmost and/or rightmost reference sample among the remaining reference samples except for the reference samples of block A or block B. As described before, at least one different filter may be selected from among a 3-tap filter, a 5-tap filter, a 7-tap filter, and an N-tap filter according to at least one of information about the current block and/or information about a neighbor block (an intra prediction mode, a block size, a block shape, the size of a transform unit, and/or division information). Herein, N may be an integer.

For example, after the values of unavailable reference samples are replaced with the same value, using the value of an available reference sample, intra prediction may be performed, using the same reference sample value. In this case, the operation of calculating a weighted sum according to a distance and/or a directionality may be skipped.

In the case where one or more reconstructed sample lines neighboring to the current block are used, if each reconstructed sample line includes an unavailable reference sample, the method described with reference to FIG. 19 may be applied.

If reference samples are padded or filtered in at least one of the foregoing methods, information indicating the padding or filtering may be encoded/decoded or may be implicitly derived in the encoder/decoder. If the information is explicitly encoded/decoded, at least one of the following entropy encoding methods may be used. In addition, after the entropy-encoded information is binarized, the binarized information may be finally encoded/decoded by CABAC(ae (v)).

Truncated Rice binarization method
K-th order Exp_Golomb binarization method
Limited K-th order Exp_Golomb binarization method
Fixed-length binarization method
Unary binarization method
Truncated Unary binarization method Now, a detailed description will be given of the step of performing intra prediction (S1230).

Intra prediction may be performed on the current block or sub-block based on the derived intra prediction mode and the reference samples. In the following detailed description, the current block may mean a sub-block.

For example, non-directional intra prediction may be performed as the intra prediction. The non-directional mode may be at least one of, for example, the DC mode and the Planar mode.

If the non-directional mode is the DC mode, intra prediction may be performed, using the mean value of one or more of the constructed reference samples. Herein, filtering may be applied to one or more prediction samples located at the boundary of the current block. The number of mean values may be 1 or larger, and prediction may be performed, using different mean values according to the positions of target samples for prediction. Different reference samples may be used according to at least one of the size or shape of the current block. For example, if the size of the block is larger than a predetermined size, one adjacent reference sample line may be used, and if the size of the block is less than the predetermined size, two adjacent reference sample lines may be used.

If the non-directional mode is the Planar mode, intra prediction may be performed, using a weighted sum calculated in consideration of distances from the constructed one or more reference samples, according to the position of a target sample for intra prediction in the current block.

As intra prediction, for example, directional intra prediction may be performed. The directional mode may be at least one of, for example, a horizontal mode, a vertical mode, and a mode having a predetermined angle.

If the directional mode is the horizontal and/or the vertical mode, intra prediction may be performed using at least one reference sample located on a horizontal and/or vertical line at the position of a target sample for intra prediction.

If the directional mode is a mode having a predetermined angle, intra prediction may be performed using one or more samples located on and adjacent to a line at a predetermined angle with respect to the position of a target sample for intra prediction. Herein, N reference samples may be used. N may be a positive integer such as 2, 3, 4, 5, and 6, and intra prediction may be performed by applying an N-tap filter such as 2-tap, 3-tap, 4-tap, 5-tap, and 6-tap filters. Herein, one or more reference sample lines may be used, and a different filter type may be applied to each reference sample line. Intra prediction may be performed by calculating a weighted mean of values obtained by applying a filter to each line. The number of reference sample lines used for the directional prediction may be different according to at least one of the directional mode, the size of the current block, and the shape of the current block.

Or intra prediction may be performed based on location information. The location information may be encoded/decoded, and a reconstructed sample block at the position may be derived as an intra prediction block for the current block. Or a block similar to the current block, searched for by a decoder may be derived as the intra prediction block of the current block.

Or, intra prediction may be performed based on a luma signal and/or a chroma signal. For example, intra prediction for a chroma signal may be performed using a reconstructed luma signal of the current block. For example, intra prediction for another chroma signal Cr may be performed using one reconstructed chroma signal Cb of the current block.

Intra prediction may be performed by using one or more of the afore-described various intra prediction methods in combination. For example, an intra prediction block may be constructed for the current block through a weighted sum of a block predicted using a predetermined non-directional intra prediction mode and a block predicted using a predetermined directional intra prediction mode. Herein, a different weight may be applied according to at least one of the intra prediction mode, block size, shape/and or sample position of the current block.

Or, regarding combined use of the one or more intra prediction modes, a prediction block may be constructed using a weighted sum of a value predicted using the intra prediction mode of the current block and a value predicted using a predetermined mode included in an MPM list.

Or, intra prediction may be performed using one or more reference sample sets. For example, intra prediction may be performed for the current block, using a weighted sum of a block intra-predicted using a reference sample obtained by not applying filtering to a constructed reference sample, and a block intra-predicted using a reference sample obtained by applying filtering to the constructed reference sample.

In the process of intra prediction, a filtering operation may be performed using a neighbor reconstructed sample. Herein, the filtering operation may or may not be performed according to at least one of the intra prediction mode, block size, shape, and/or sample position of the current block. The filtering operation may be included in the intra prediction process and thus performed as one step.

In performing intra prediction by dividing the current block into sub-blocks and deriving the intra prediction mode of each sub-block using the intra prediction mode of a neighbor block, filtering may be applied to each sub-block of the current block. For example, a low-pass filter may be applied to the entire current block. Or, a filer may be applied to a sample located on the boundary of each sub-block. Or a filter may be applied to the prediction block or reconstructed block of each sub-block, and one or more samples of a sub-block to which the filter is applied may be used in intra prediction of a subsequent sub-block.

In dividing the current block into sub-blocks and performing intra prediction for each sub-block, each sub-block may refer to at least one of a coding/decoding block, a prediction block, and a transform block. For example, if the current block is of size 64×64 and a sub-block is of size 16×16, the intra prediction mode of a prediction block being each sub-block may be derived and/or intra prediction may be performed for the prediction block. If each of the one or more sub-blocks is further divided into 8×8 or 4×4 blocks, each of the 8×8 or 4×4 blocks may be a transform block, and intra prediction may be performed for the blocks obtained by the further division using the intra prediction mode of the 16×16 block.

In the directional intra prediction, the current block may be encoded/decoded using at least one of N directional modes. Herein, N may be a positive integer such as 33 or 65.

In the directional intra prediction, the constructed reference sample may be reconstructed according to a directional prediction mode. For example, if the directional prediction mode is a mode in which all of left and upper reference samples are used, a one-directional array may be constructed with the left or upper reference samples.

Figure 20:
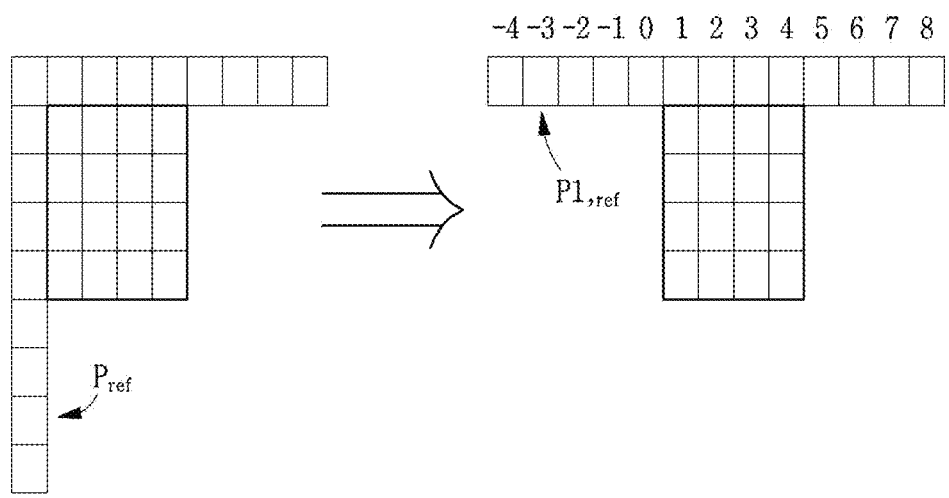
FIG. 20 is a view depicting an embodiment of generating a 1D reference sample array $p_{1,ref}$ from $P_{ref}$.

FIG. 20 is a view depicting an embodiment of generating a 1D reference sample array $p_{1,ref}$ from $P_{ref}$.

For example, as illustrated in FIG. 20, a 1D array of upper reference samples may be constructed using one or more of left reference samples. Different samples out of the left samples may be used to construct the upper reference samples according to the directional mode. The upper reference samples may be constructed by moving the left reference samples, or the upper reference samples may be constructed by using a weighted sum of one or more left reference samples.

In the directional intra prediction, real number-based interpolated prediction may be performed. For example, an offset (iIdx) and/or a weight (iFact) for prediction sample interpolation may be determined according to the position of a sample in the current block based on an angle parameter (intraPredAngle) corresponding to each directional prediction mode, as follows.

For example, on the assumption of interpolation in units of 1/32 pel, an offset and a weight for a directional mode having a vertical direction may be determined by the following [Equation 7].

$$iIdx=((y+1)*intraPredAngle)>>5$$

$$iFact=((y+1)*intraPredAngle)\&31 \qquad \text{[Equation 7]}$$

A different prediction sample value may be determined according to the value of iFact in [Equation 7]. For example, if iFact is not 0, a prediction position in a reference sample $P_{1,ref}$ is not an integer-based location (full sample location) but a real number-based location. Therefore, a prediction sample value at a target sample position (x, y) may be generated using a plurality of reference samples (e.g., two left and right adjacent reference samples) adjacent to a real-number position by the following [Equation 8]. Herein, the plurality of adjacent reference samples may be 4 or 6 left and right adjacent reference samples.

$$\text{predSamples}[x][y]=((32-\text{iFact})*p_{1,ref}[x+\text{iIdx}+1]+ \text{iFact}*p_{1,ref}[x+\text{iIdx}+2]+16)>>5 \quad \text{[Equation 8]}$$

For example, if iFact is 0, a prediction sample value may be generated by [Equation 9] below. Or, a 3-tap [1/4:2/4:1/4] filter may be applied using the reference sample $P_{1,ref}$ and left and right reference samples.

$$\text{predSamples}[x][y]=p_{1,ref}[x+\text{iIdx}+1] \quad \text{[Equation 9]}$$

In the case of at least one of the horizontal mode and/or the vertical mode among the directional prediction modes, filtering may not be performed for a reference sample. In addition, interpolated prediction may not be needed for the reference sample. Further, since prediction is possible only with upper or left reference samples, the process of constructing a 1D array for the reference sample may not be needed.

Now, a description will be given of the step of performing non-directional prediction according to the present invention.

In the Planar mode, intra prediction may be performed by calculating a weighted sum in consideration of distances from the one or more constructed reference samples according to the position of a target intra prediction sample in the current block.

Figure 21:
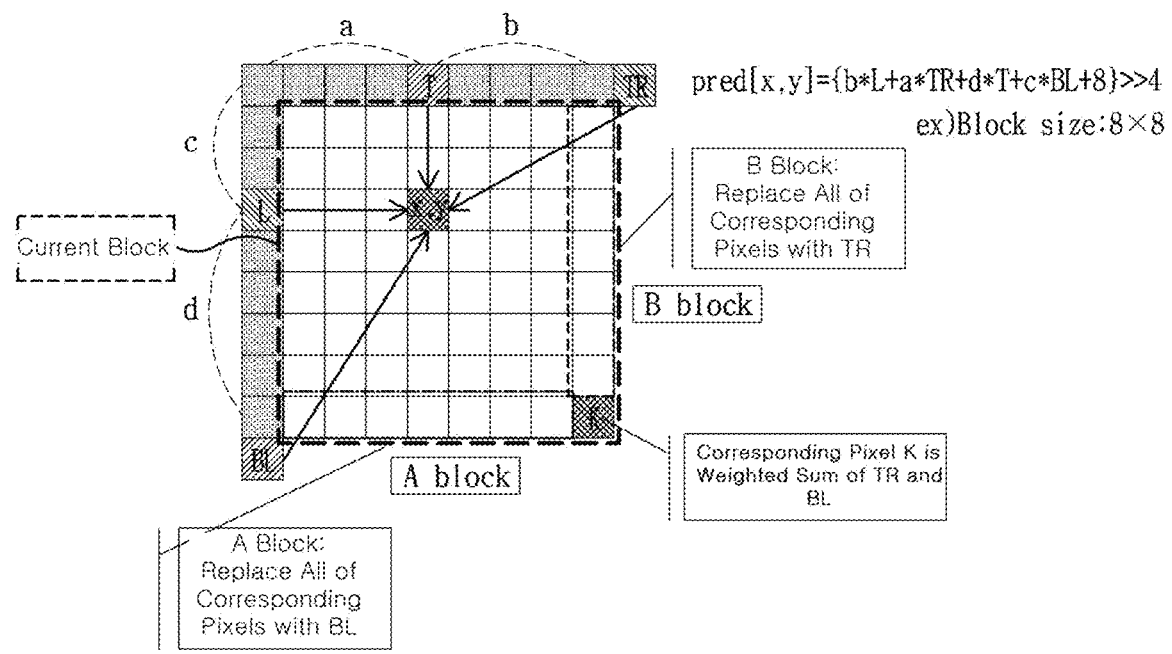
FIG. 21 is a view depicting intra prediction according to an embodiment of the present invention.

FIG. 21 is a view depicting intra prediction according to an embodiment of the present invention.

A current block may be of size 8×8 and its intra prediction mode may be the Planar mode. In the Planar mode, as illustrated in FIG. 21, a bottom right sample K in the current block may be derived using a weighted sum of a top right reference sample TR and a bottom left reference sample BL of the current block. The weighted sum may be calculated according to at least one of information about the current block and/or information about a neighbor block (an intra prediction mode, a block size, shape, the size of a transform unit, and/or division information). In the example illustrated in FIG. 21, the sample K is derived using the weighted sum of TR and BL, which should not construed as limiting. For example, the sample K may be derived through the mean value, the minimum value, the maximum value, or any weighted sum of TR and BL.

In the example illustrated in FIG. 21, after samples included in a bottom row of the current block (in block A) are replaced with BL and samples included in a right column of the current block (in block B) are replaced with TR, a target prediction sample at a position (x, y) in the current block may be predicted to be a weighted sum based on the position of the sample. For example, [Equation 10] may be used.

$$\text{pred}[x,y]=(b*L+a*TR+d*T+c*BL+8)>>4 \quad \text{[Equation 10]}$$

Or, in another embodiment, for example, the samples included in the bottom row within the current block (block A) may be derived as weighted sums according to distances of BL and K, and the samples included in the right column within the current block (block B) may be derived as weighted sums according to distances of TR and K. And a prediction target sample at an arbitrary position (x, y) within the current block may be predicted as a weighted sum based on the position of each sample. Herein, for example, [Equation 10] may be used, and the weighted sums according to distance of TR and K and the weighted sums according to distances of BL and K may be used respectively, instead of TR and BL values.

Figure 22:
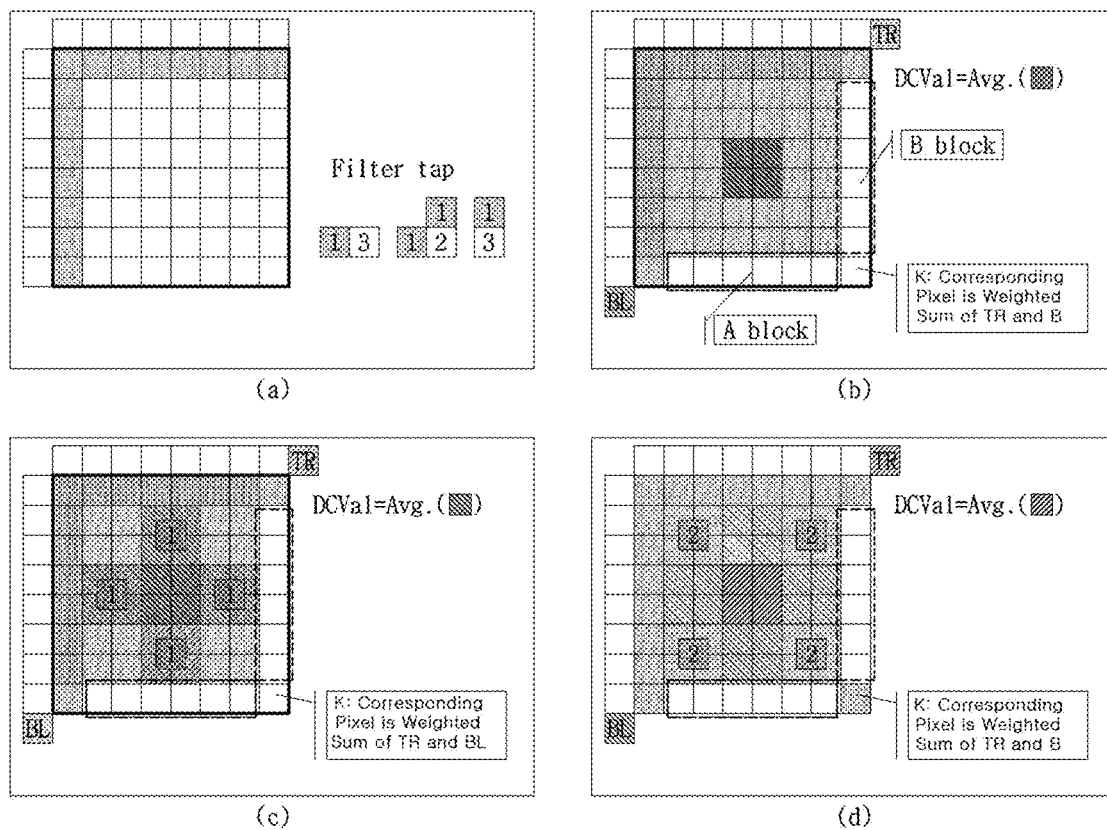
FIG. 22 is a view depicting intra prediction according to another embodiment of the present invention.

FIG. 22 is a view depicting intra prediction according to another embodiment of the present invention.

As illustrated in FIG. 22, intra prediction may be performed in a combination of the Planar mode and the DC mode in order to generate an intra prediction block for a current block.

In FIG. 22, a bold solid line represents an 8×8 current block.

As illustrated in (a) of FIG. 22, after the average value is calculated using at least one among reference samples neighboring to the current block, 3-tap or 2-tap based filtering may be performed for boundary pixels (shaded pixels) in a left column and a top row within the current block based on neighboring reference samples. For example, a filter used in the filtering may have any of the shapes illustrated on the right side in (a) of FIG. 22.

Subsequently, as illustrated in (b) of FIG. 22, after average value DCVal is calculated using at least one among reference samples neighboring to the current block, intra prediction may be performed for a target prediction block including one or more samples neighboring to the center of the current block (hereinafter, referred to as "center block"). The target prediction block may be identical to the 8×8 current block or may be smaller, such as 2×2, 3×3, 4×4, or the like, in size and/or shape.

For example, as in the Planar mode, a bottom right sample K in the current block may be derived using a weighted sum of a top right reference sample TR and a bottom right reference sample BL of the current block. The weighted sum may be calculated according to at least one of information about the current block and/or information about a neighbor block (an intra prediction mode, a block size, a shape, the size of a transform unit, and/or division information). The sample K is derived using the weighted sum of TR and BL, which should not be construed as limiting. For example, the sample K may be derived through the mean value, the minimum value, the maximum value, or any weighted sum of TR and BL.

For example, samples included in a bottom row of the current block (in block A) may be replaced with BL, and samples included in a right column of the current block (in block B) may be replaced with TR. Or, the samples included in the bottom row of the current block (in block A) may be derived as weighted sums according to distances of BL and K, and the samples included in the right column of the current block (in block B) may be derived as weighted sums according to distances of TR and K.

Subsequently, blocks to the left, to the right, above, and under the center block of the current block (blocks marked with "1" in (c) of FIG. 22) may be predicted. Then, intra prediction may be performed for the remaining blocks (blocks marked with "2" in (d) of FIG. 22). For example, pixel-wise intra prediction may be performed for the remaining blocks, independently or in parallel.

As described before, the edge pixels and the center block of an arbitrary size in the current block may be predicted. Further, sub-block-wise intra prediction may be performed using at least one of already-predicted neighbor sample values, with each sub-block including at least one target prediction sample. The intra prediction may be performed according to at least one of information about the current block and/or a neighbor block (an intra prediction mode, a block size, a shape, the size of a transform unit, and/or division information).

For example, each of the four sub-blocks (the blocks marked with "1") illustrated in (c) of FIG. 22 has information about prediction performed on the center, up, down, left, and/or right side according to the above method. Accordingly, intra prediction may be performed for each sub-block independently or in parallel. The four sub-blocks (the blocks marked with "2") illustrated in (d) of FIG. 22 may also be subjected to independent or parallel sub-block-wise intra prediction based on information about already intra-predicted neighbor samples, for example, by calculating weighted sums.

Figure 23:
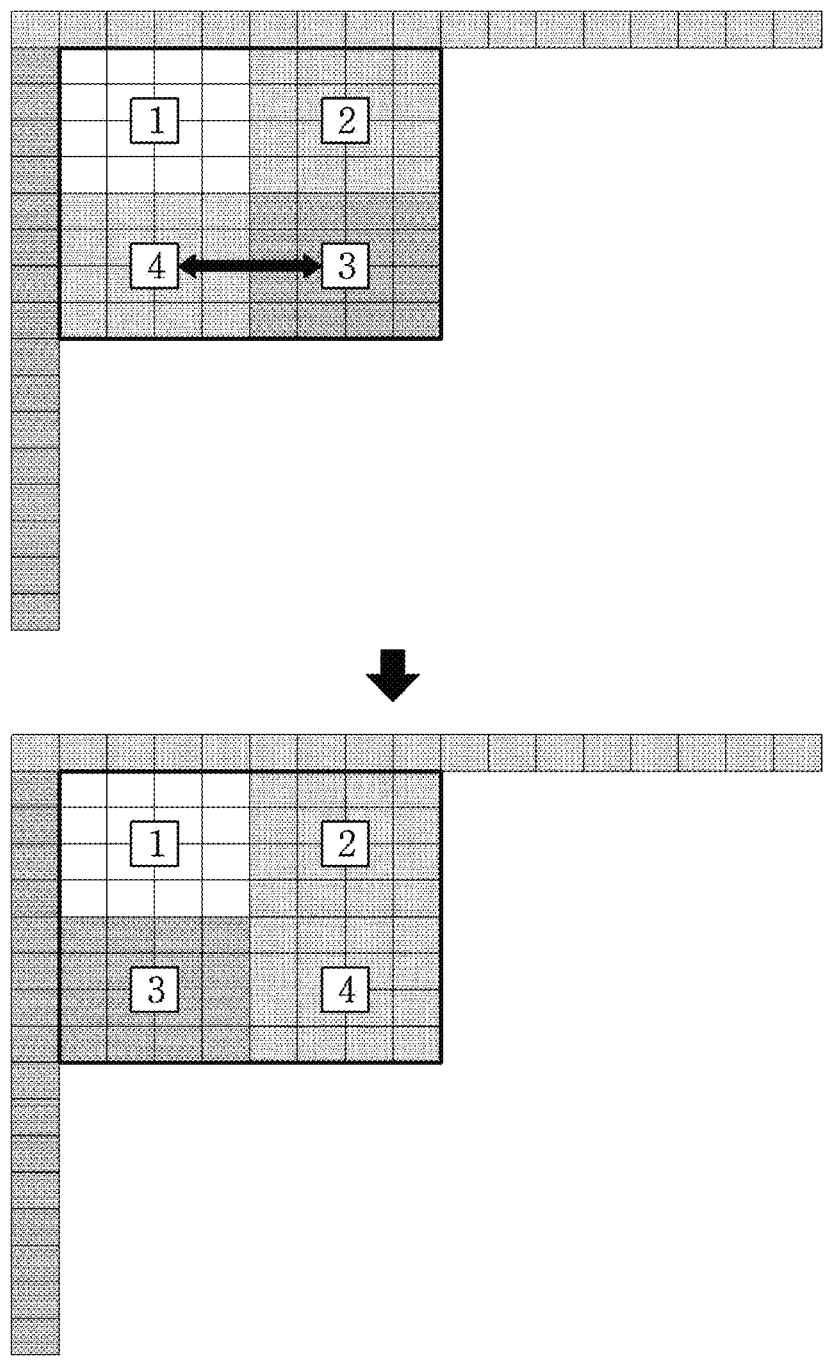
FIG. 23 is a view depicting intra prediction according to another embodiment of the present invention.

FIG. 23 is a view depicting intra prediction according to another embodiment of the present invention.

After reference samples are generated for a current block, the current block may be divided into one or more sub-blocks according to the size and/or shape of the current block. Subsequently, intra prediction may be performed by changing the positions of the sub-blocks. The method described with reference to FIG. 23 may be applied to non-directional prediction as well as directional prediction.

For example, as illustrated in FIG. 23, intra prediction may be performed for an 8×8 current block. Herein, after the positions of four sub-blocks obtained by dividing the current block are changed randomly, intra prediction may be performed. While the current block is shown in FIG. 23 as divided into four sub-blocks, the division of the current block is not limited thereto. The current block may be divided into N sub-blocks, N being equal to or larger than 2.

For example, the current block may be divided into four sub-blocks. In addition, after sample values within the current block are reordered in each sub-block obtained by dividing the current block according to the same rule defined in the encoder/decoder, intra prediction may be performed.

For example, after the current block is divided into two or more sub-blocks, the positions of the sub-blocks may be changed or the coding samples of the sub-blocks may be reordered. Or the change of the positions of the sub-blocks and the reordering of the samples in the sub-blocks may be performed at the same time.

Information indicating that intra prediction has been performed in at least one of the methods described with reference to FIGS. 21, 22, and 23 may be encoded/decoded, or may be implicitly derived in the encoder/decoder. If the information is explicitly encoded/decoded, at least one of the following entropy encoding methods may be used. In addition, after the entropy-encoded information is binarized, the binarized information may be finally encoded/decoded by CABAC(ae(v)).

Truncated Rice binarization method
K-th order Exp_Golomb binarization method
Limited K-th order Exp_Golomb binarization method
Fixed-length binarization method
Unary binarization method
Truncated Unary binarization method The intra encoding/decoding process may be performed for each of luma and chroma signals. For example, in the intra encoding/decoding process, at least one method of deriving an intra prediction mode, dividing a block, constructing reference samples and performing intra prediction may be differently applied for a luma signal and a chroma signal.

The intra encoding/decoding process may be equally performed for luma and chroma signals. For example, in the intra encoding/decoding process being applied for the luma signal, at least one of deriving an intra prediction mode, dividing a block, constructing reference samples and performing intra prediction may be equally applied to the chroma signal.

The methods may be performed in the encoder and the decoder in the same manner. For example, in the intra encoding/decoding process, at least one method of deriving an intra prediction mode, dividing a block, constructing reference samples and performing intra prediction may be applied in the encoder and the decoder equally. In addition, orders of applying the methods may be different in the encoder and the decoder. For example, in performing intra encoding/decoding for the current block, an encoder may encode an intra prediction mode determined by performing at least one intra prediction after constructing reference samples.

The embodiments of the present invention may be applied according to the size of at least one of a coding block, a prediction block, a block, and a unit. Here, the size may be defined as the minimum size and/or the maximum size in order to apply the embodiments, and may be defined as a fixed size to which the embodiment is applied. In addition, a first embodiment may be applied in a first size, and a second embodiment may be applied in a second size. That is, the embodiments may be multiply applied according to the size. In addition, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or greater than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a ¹⁄₁₆-pixel (¹⁄₁₆-pel) unit, a ¹⁄₃₂-pixel (¹⁄₃₂-pel) unit, and a ¹⁄₆₄-pixel (¹⁄₆₄-pel) unit, the embodiments of the present invention may be applied. In addition, in performing motion vector prediction, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using motion vector prediction as well as inter prediction and motion compensation methods using a skip mode, a merge mode, etc.

The shape of the block to which the embodiments of the present invention is applied may have a square shape or a non-square shape.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:
1. An image decoding method, comprising:
deriving an intra prediction mode of a current block;
determining a search range of reference samples for an intra prediction of the current block;
determining the reference samples for the intra prediction of the current block among the search range of the reference samples;
generating a prediction block by performing the intra prediction for the current block based on the intra prediction mode and the reference samples; and
reconstructing the current block based on the prediction block,
wherein a predetermined number of the reference samples are non-adjacent reference samples that are apart from each other by a predetermined sample unit among the search range, and
wherein the predetermined sample unit is determined to be a half or a quarter of a height or width of the current block.

2. The method of claim 1, wherein the search range is determined based on the intra prediction mode of the current block and a size of the current block.

3. The method of claim 1, wherein the reference samples are determined by shifting the predetermined sample unit only for a left reference sample or an upper reference sample of the current block.

4. An image encoding method, comprising:
deriving an intra prediction mode of a current block;
determining a search range of reference samples for an intra prediction of the current block;
determining the reference samples for the intra prediction of the current block among the search range of the reference samples;
generating a prediction block by performing the intra prediction for the current block based on the intra prediction mode and the reference samples;
reconstructing the current block based on the prediction block,
wherein a predetermined number of the reference samples are non-adjacent reference samples that are apart from each other by a predetermined sample unit among the search range, and
wherein the predetermined sample unit is determined to be a half or a quarter of a height or width of the current block.

5. The method of claim 4, wherein the search range is determined based on the intra prediction mode of the current block and a size of the current block.

6. The method of claim 4, wherein the reference samples are determined by shifting the predetermined sample unit only for a left reference sample or an upper reference sample of the current block.

7. A non-transitory computer-readable storage medium storing a bitstream generated by a method of encoding a video, the method comprising:
deriving an intra prediction mode of a current block;
determining a search range of reference samples for an intra prediction of the current block;
determining the reference samples for the intra prediction of the current block among the search range of the reference samples;
generating a prediction block by performing the intra prediction for the current block based on the intra prediction mode and the reference samples; and
reconstructing the current block based on the prediction block,
wherein a predetermined number of the reference samples are non-adjacent reference samples that are apart from each other by a predetermined sample unit among the search range, and
wherein the predetermined sample unit is determined to be a half or a quarter of a height or width of the current block.

* * * * *